US006714216B2

(12) United States Patent
Abe

(10) Patent No.: US 6,714,216 B2
(45) Date of Patent: *Mar. 30, 2004

(54) VIDEO EDITING APPARATUS AND METHOD

(75) Inventor: Keiko Abe, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/405,577

(22) Filed: Sep. 27, 1999

(65) Prior Publication Data

US 2003/0016254 A1 Jan. 23, 2003

(30) Foreign Application Priority Data

Sep. 29, 1998 (JP) .............................. 10-275785

(51) Int. Cl.[7] .................................. G09G 5/00

(52) U.S. Cl. ..................... 345/723; 345/716; 345/719; 345/722; 345/720

(58) Field of Search ................................. 345/716, 719, 345/723, 720, 724; 386/52, 55; 348/700

(56) References Cited

U.S. PATENT DOCUMENTS

| 4,774,600 | A |   | 9/1988 | Baumeister |
| 5,237,648 | A |   | 8/1993 | Mills et al. |
| 5,388,197 | A | * | 2/1995 | Rayner ........................ 345/154 |
| 5,521,841 | A | * | 5/1996 | Arman et al. ........... 364/514 A |
| 5,828,371 | A | * | 10/1998 | Cline et al. .................. 345/328 |

FOREIGN PATENT DOCUMENTS

EP  0 564 247  10/1993

* cited by examiner

*Primary Examiner*—Kristine Kincaid
*Assistant Examiner*—Mylinh T Tran
(74) *Attorney, Agent, or Firm*—Frommer Lawrence & Haug LLP; William S. Frommer; Dennis M. Smid

(57) ABSTRACT

A video editing apparatus for setting an editing point for a video sequence comprising a device for successively extracting at least one vertical line from each of a plurality of video frames of the video sequence to produce vertical slits and successively arranging the vertical slits as a number of video images representing individual video frames in a horizontal direction to produce a video browser for browsing the video sequence, a display for displaying the video browser on a display, and an editing device for setting an editing point for the video sequence in a coordinated relationship to a time base of the video browser. Accordingly, even if the video sequence is relatively long, video images can be confirmed in a short time from the video browser, and the editing points can be decided in a short time.

7 Claims, 15 Drawing Sheets

F I G. 8
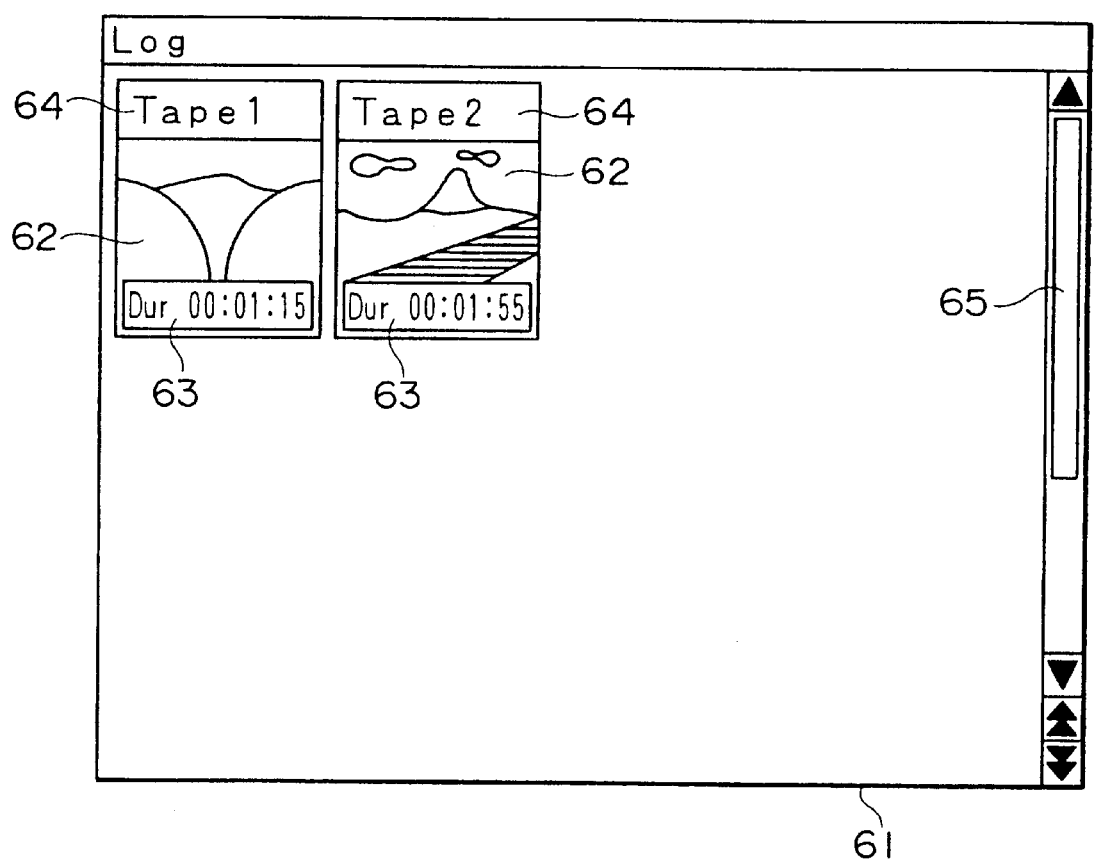

VIDEO EDITING APPARATUS AND METHOD

BACKGROUND OF THE INVENTION

This invention relates to a video editing apparatus and method, and more particularly to a video editing apparatus and method wherein editing points such as a mark-in point and a mark-out point are set for a video sequence. More specifically, the present invention relates to a video editing apparatus and method wherein an editing point is set for a plurality of video sequences imaged from multiple angles with the same time base.

Video editing apparatus of the type mentioned are conventionally known, and one of the related art video editing apparatus employs two video tape recorders of the analog type.

In the video editing apparatus of the structure just described, one of the video tape recorders is used to play back a video tape (hereinafter referred to as material video tape) on which a video signal is recorded as a source video sequence in advance, and a motion picture based on the reproduced video signal is displayed on a monitor.

Then, an operator of the video editing apparatus visually observes the motion picture displayed on the monitor to select a video clip, and the other video tape recorder is used to record a video signal corresponding to the selected video clip (the video signal is hereinafter referred to as clip video signal) onto the other video tape (hereinafter referred to as clip video tape).

In this manner, the video editing apparatus can successively repeat an editing process including selection of a video clip and recording of a clip video signal corresponding to the selected video clip to produce a clip video tape on which a plurality of video clips are recorded.

The video editing apparatus is required to record clip video signals successively reproduced from a clip video tape in a predetermined order onto the clip video tape, so that the clip video signals may be broadcast as they are as motion pictures of a predetermined broadcasting program.

Therefore, the video editing apparatus is sometimes required to perform a fast feeding or rewinding operation of a material video tape using one of the video tape recorders. Further, when it is intended to produce video clips using a plurality of material video tapes, the video editing apparatus is sometimes required to successively exchange the material video tapes to play them back using just one of the video tape recorders, resulting in a complicated editing operation.

In recent years, a video editing apparatus has been proposed which employs, as a recording medium of a source video sequence, a non-linear medium having a great capacity and multiple accessibility, such as a hard disk, and employs a graphical user interface.

In a video editing apparatus of the type mentioned, since a non-linear medium is used, a plurality of source video sequences recorded in advance on the non-liner medium can be accessed at random. The video editing apparatus is advantageous in that it eliminates the necessity for such complicated operation required by the video editing apparatus described first as a fast feeding or rewiring operation of a material video tape on one of two video tape recorders or an exchanging operation of a material video tape.

The video editing apparatus is advantageous also in that, since it employs a graphical user interface, it can select video clips successively and at random, that is, scenes of a motion picture each between an editing start point (hereinafter referred to as mark-in point) and editing end point (hereinafter referred to as mark-out point) are designated by a mark-in point and a mark-out point on a motion picture displayed on a monitor, and an order of the selected video clips can be determined on the monitor in accordance with the necessity, whereby the efficiency in editing operation can be augmented.

Further, in the video editing apparatus, a time line representative of the time base is provided on the graphical user interface. An editing operator used to paste a video sequence or a video clip, which is an object of editing, onto the time line and perform an editing operation of setting editing points such as a mark-in point and a mark-out point on the time line.

However, while the name of a video sequence or a video clip can be displayed on the time line, it cannot be discriminated what video data a video frame has from the display of the time line. In order to decide a desired editing point, the editing operator performs operation of designating a suitable point on the time line by means of a mouse and confirming an image of a video frame at the point designated using the mouse. In short, the operation to decide an editing point must be repeated until a desired video image is found out.

If the duration of a video sequence or a video clip of an editing object is as short as several seconds, then the editing operation of deciding an editing point may not require very much time. However, if the duration of a video sequence or a video clip of an editing object is several tens minutes or several hours, then since the number of video frames whose videos must be confirmed is huge, very long time is required for the operation of deciding an editing point.

SUMMARY OF THE INVENTION

It is an object of the present invention to provide a video editing apparatus and method by which an editing operation for setting an editing point of a video sequence or a video clip can be performed rapidly and efficiently.

In order to attain the object described above, according to a video editing apparatus and a video editing method of the present invention, a video browser for browsing video frames of a video sequence being supplied is produced and the produced video browser is displayed in a coordinated relationship to the time base on a monitor, and then a graphical user interface which allows editing points such as an editing start point and an editing end point set for the video sequence to be displayed in a coordinated relationship to the video browser is produced. Accordingly, even if the video sequence which is an object of editing is, for example, a very long video sequence, images of individual video frames of the video sequence can be confirmed readily from the video browser. Consequently, editing points can be determined in a short time.

More particularly, according to an aspect of the present invention, there is provided a video editing apparatus for setting an editing point for a video sequence, including a means for successively sampling vertical lines of video frames of the video sequence to produce vertical slits and successively arranging the vertical slits as video images representing the individual video frames in a horizontal direction to produce a video browser for browsing the video sequence, a display means for displaying the video browser on a monitor, and an editing means for setting an editing point for the video sequence in a coordinated relationship to the time base of the video browser.

According to another aspect of the present invention, there is provided a video editing apparatus for setting an editing point for a video sequence, including a video browser production means for producing a video browser for browsing the video sequence based on vertical video images obtained by sampling video frames of the video sequence in a vertical direction, a display means for displaying the video browser on a monitor, and an editing point setting means for setting an editing start point and an editing end point in a coordinated relationship to the video browser displayed by the display means.

The video editing apparatus may be constructed such that the video browser production means further produces an audio waveform representative of a level of an audio signal corresponding to the video sequence, and the display means displays the audio waveform in a coordinated relationship to the video browser in the time base direction together with the video browser.

Preferably, the video browser production means successively shifts the sampling position of the vertical video image in a horizontal direction for the individual video frames.

The display means may display video browsers produced from a plurality of video sequences having the same time base in a coordinated relationship to each other.

According to a further aspect of the present invention, there is provided a video editing method for setting an editing point for a video sequence, comprising the steps of producing a video browser for browsing the video sequence based on vertical video images obtained by sampling video frames of the video sequence in a vertical direction, displaying the video browser on a monitor, and setting an editing start point and an editing end point in a coordinated relationship to the video browser displayed on the monitor.

The video editing method may be constructed such that, wherein, when the video browser is produced, an audio waveform representative of a level of an audio signal corresponding to the video sequence is also produced, and the produced audio waveform is displayed together with the video browser in a coordinated relationship to the video browser in the time base direction.

The vertical video images which form the video browser may be video data sampled from positions of the individual video frames successively shifted in a horizontal direction.

A plurality of video browsers produced from a plurality of video sequences having the same time base may be displayed in a coordinated relationship to each other.

With the video editing apparatus and method of the present invention, a video browser for browsing video frames of a video sequence supplied is produced, and a graphical interface constructed such that editing points such as a mark-in point and a mark-out point set for the video sequence can be displayed in a coordinate relationship to the time base of the video browser is shown on a monitor. Accordingly, even if the video sequence is, for example, a very long video sequence, video images can be confirmed in a short time from the video browser, and consequently, the editing points can be decided in a short time. Further, where video sequences of a plurality of channels are displayed at a time, editing points can be set readily even for a plurality of video sequences imaged from multiple angles and having the same time base.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 8 is a schematic view showing a clip display window of the video editing apparatus of FIG. 2;

DESCRIPTION OF THE PREFERRED EMBODIMENT

1. Video Browser

Figure 1:
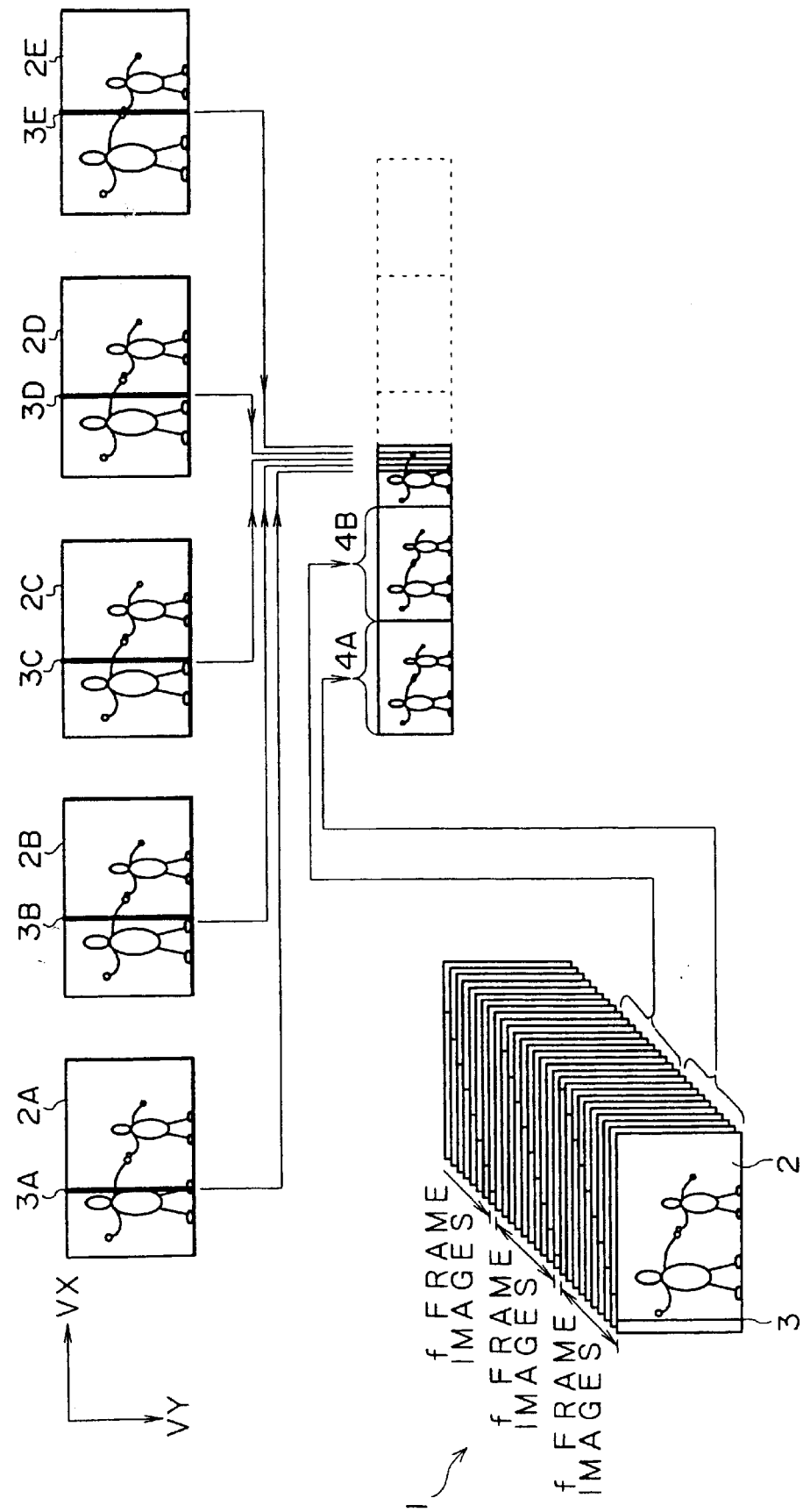
FIG. 1 is a diagrammatic view illustrating a concept of a video browser.

Referring first to FIG. 1, a video sequence can be regarded as a sequence in which frame images at successive points of time are successively arranged in order in the time base direction.

Actually, for example, in the NTSC (National Television System Committee) system, the frame frequency of a video signal is approximately 30 Hz, and accordingly, a motion picture is formed from 30 frame images per second.

As seen from FIG. 1, vertical slits (3A to 3E) each formed from video pixels on a vertical line or lines are produced from successive video frames of a video sequence 1. The vertical slits are not laid at the same position in each video frame, but are formed from pixels extracted from different positions of the individual video frames successively shifted in a horizontal direction. Accordingly, the position of the vertical slit 3B of the second video frame 2B in FIG. 1 is shifted in a horizontal direction by a distance equal to one slit from the position of the vertical slit 3A of the first video frame 2A. Also the position of each of the vertical slits 3C, 3D and 3E is similarly shifted in a horizontal direction by a distance equal to one slit from a video frame preceding to it.

A video browser is a video image produced by successively arranging the vertical slits extracted from the video frames in order in a horizontal direction. Naturally, the width of and the distance between the vertical slits can be set arbitrarily. Accordingly, by using the video browser, what video frames are included in the video sequence can be grasped readily with a small display area.

Description is given of, for example, a video sequence of 20 minutes. In order to display all video frames (600 frames) to determine editing points, 600 video images must be displayed. An ordinary monitor does not have an area in which 600 video images are displayed at a time. However, according to the video editing apparatus of the present invention, a vertical slit is produced as an video which represents one video frame, and such vertical slits are successively arranged in a horizontal direction to produce a video browser. Accordingly, a video browser for browsing a video sequence for 20 minutes can be displayed provided only a display area which includes 600 lines in a horizontal direction is available. In short, a video sequence can be browsed with a very small display area.

Here, since the vertical slits are vertical video images extracted from different video frames, it is liable to be considered that, even if the vertical slits are successively arranged in a horizontal direction, the video browser thus produced generally exhibits an video of confusing or non-sensitive. However, video data which form an ordinary motion picture exhibit a succession of similar video image over several tens frames. In particular, in the example illustrated in FIG. 1, video frames which successively appear illustrate a parent and a child walking with their hands held. Therefore, since vertical slits of at least several tens lines of a video browser are produced from similar video frames, the video browser does not exhibit a confusing or non-sensitive image.

The extraction position of a vertical slit 3 is successively shifted from the left end of the screen to a rightward (horizontal direction), and when it reaches the right end of the screen, it returns to the left end of the screen again and is then shifted rightwardly therefrom.

For example, where n=1 and a frame image 2 includes X dots in a horizontal direction while the width of the vertical slit 3 is ΔX dots, the slit position is successively shifted from the right end to the left end of the screen for each one frame image given by the following expression (1)

$$f = X/\Delta X \quad (1)$$

and a video browser 4 for one screen which includes X dots in a horizontal direction is produced from the vertical slits 3 obtained while the extraction position of the vertical slit 3 is successively shifted from the left end to the right end of the screen.

The video browser 4 can be recognized as a compressed still picture of contents of a motion picture based on the f-th frame images 2.

Accordingly, by producing such video browsers 4 for the overall source video sequence from the beginning to the last end, a general flow of the source video sequence and a variation of a video frame can be recognized accurately in a short time based on the thus produced video browser 4.

2. Construction of Video Editing Apparatus

Figure 2:
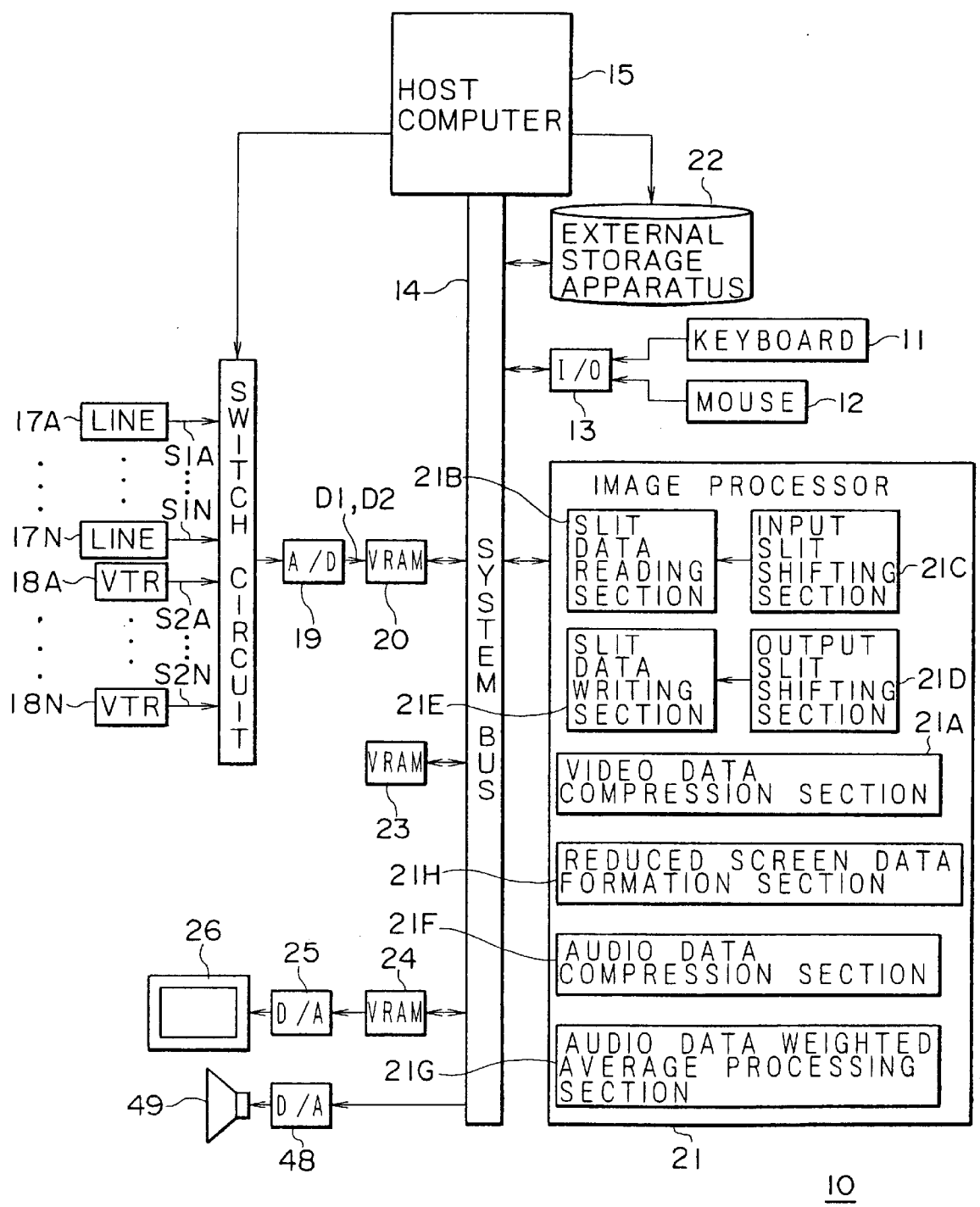
FIG. 2 is a block diagram showing a video editing apparatus to which the present invention is applied.

FIG. 2 shows a video editing apparatus to which the present invention is applied. Referring to FIG. 2, the video editing apparatus shown is generally denoted at 10 and includes a keyboard 11 and a mouse 12 connected to a host computer 15 successively through an input/output circuit 13 and a system bus 14. Consequently, an operator can input various commands to the host computer 15 from the keyboard 11 and the mouse 12.

When the video editing apparatus 10 is in a material fetching mode, the host computer 15 controls a switch circuit 16 in accordance with a command provided by an operator to select one of video signal supply sources from a plurality of transmission lines 17A to 17N and a plurality of video tape recorders 18A to 18N connected to the switch circuit 16, so that one of video signals video signals S1A to S1N and S2A to S2N which is supplied from the selected video signal supply source is sent out to an analog to digital conversion circuit 19.

The analog to digital conversion circuit 19 successively converts one of the video signals S1A to S1N and S2A to S2N supplied thereto into digital video data D1 and successively stores the video data D1 in a unit of a frame into a first storage area (formed corresponding to an actual display screen) of a first VRAM (Video Random Access memory) 20.

The video data D1 stored in a unit of a frame stored in the first VRAM 20 are successively read out over the system bus 14 by an image processor 21 and compression coded in accordance with predetermined standards, such as the JPEG (Joint Photographic Experts Group) by a video data compression section 21A of the image processor 21.

The compression coded video data D1 are supplied over the system bus 14 to an external storage apparatus 22 of, for example, a RAID (Redundant Array of Inexpensive Disks) configuration, by which new time codes are added to the video data D1 and resulting video data are converted into a file under the control of the host computer 15. The file is stored into the external storage apparatus 22.

A slit data reading section 21B of the image processor 21 samples data (hereinafter referred to as slit data) of the vertical slit 3 (FIG. 1) described hereinabove from the video data D1 for one frame which is successively written into the first VRAM 20, successively shifting the extraction position in one direction under the control of the input slit shifting section 21C.

The thus extracted slit data are successively written into a first storage area (formed corresponding to an actual display screen) of a second VRAM 23 under the control of an output slit shifting section 21D of the image processor 21 while the writing position is successively shifted in one direction by a slit data writing section 21E.

Each time slit data for one screen are written into the second VRAM 23, they are read out under the control of the host computer 15 and supplied to the external storage apparatus 22 to be held over the system bus 14, so that they are successively stored as an element of a database which manages a file of the video data D1 (the file is hereinafter referred to as video data file).

Incidentally, also one of audio signals S3A to S3N and S4A to S4N which correspond to the video signals S1A to S1N and S2A to S2N, respectively is supplied from the video signal supply source selected by controlling the switch circuit 16 and successively converted into digital data by the analog to digital conversion circuit 19. Audio data D2 in a predetermined unit corresponding to the video data D1 of a unit of a frame described above obtained by the digital conversion are successively stored into a second storage area (formed in a corresponding relationship to the first storage area) of the first VRAM 20.

The audio data D2 in the predetermined unit stored in the first VRAM 20 are successively read out over the system bus 14 by the image processor 21, in which they are compression coded in accordance with a predetermined coding system by an audio data compression section 21F.

The compression coded audio data D2 are supplied over the system bus 14 to the external storage apparatus 22 to be held, by which they are converted into and stored as a file under the control of the host computer 15. The host computer 15 stores information of the file of the audio data D2 as an element of a corresponding database of a video data file into the external storage apparatus 22.

Further, an audio data weighted averaging processing section 21G of the image processor 21 reads out the audio data D2 successively written in the first VRAM 20 and performs weighted averaging processing for the audio data D2 to produce waveform data having an audio waveform based on the audio data D2. The waveform data are successively written into a second storage area (formed corresponding to the first storage area) of the second VRAM 23.

Each time the waveform data for a predetermined unit are written into the second VRAM 23, they are read out under the control of the host computer 15 and supplied over the system bus 14 to the external storage apparatus 22 so that they are stored as an element of the corresponding database of a video data file into the external storage apparatus 22.

In this manner, the video editing apparatus 10 can produce compression coded data of a motion picture and sound based on a designated one of the video signals S1A to S1N and S2A to S2N supplied from the plurality of video signal supply sources to the switch circuit 16 and audio signals S3A to S3N and S4A to S4N corresponding to the designated video signal supplied from the plurality of video signal supply sources, and a database including various data such as video data of video browsers and waveform data of audio waveforms, and store the thus produced data and database into the external storage apparatus 22.

On the other hand, when the video editing apparatus video data stored in advance in the external storage apparatus 22 and supplies the video data to the image processor 21.

The image processor 21 produces video data (hereinafter referred to as display video data) for displaying a predetermined screen on a monitor based on the video data supplied thereto from the external storage apparatus 22 and sends out the video data to a third VRAM 24 so that they are stored into the third VRAM 24.

Figure 3:
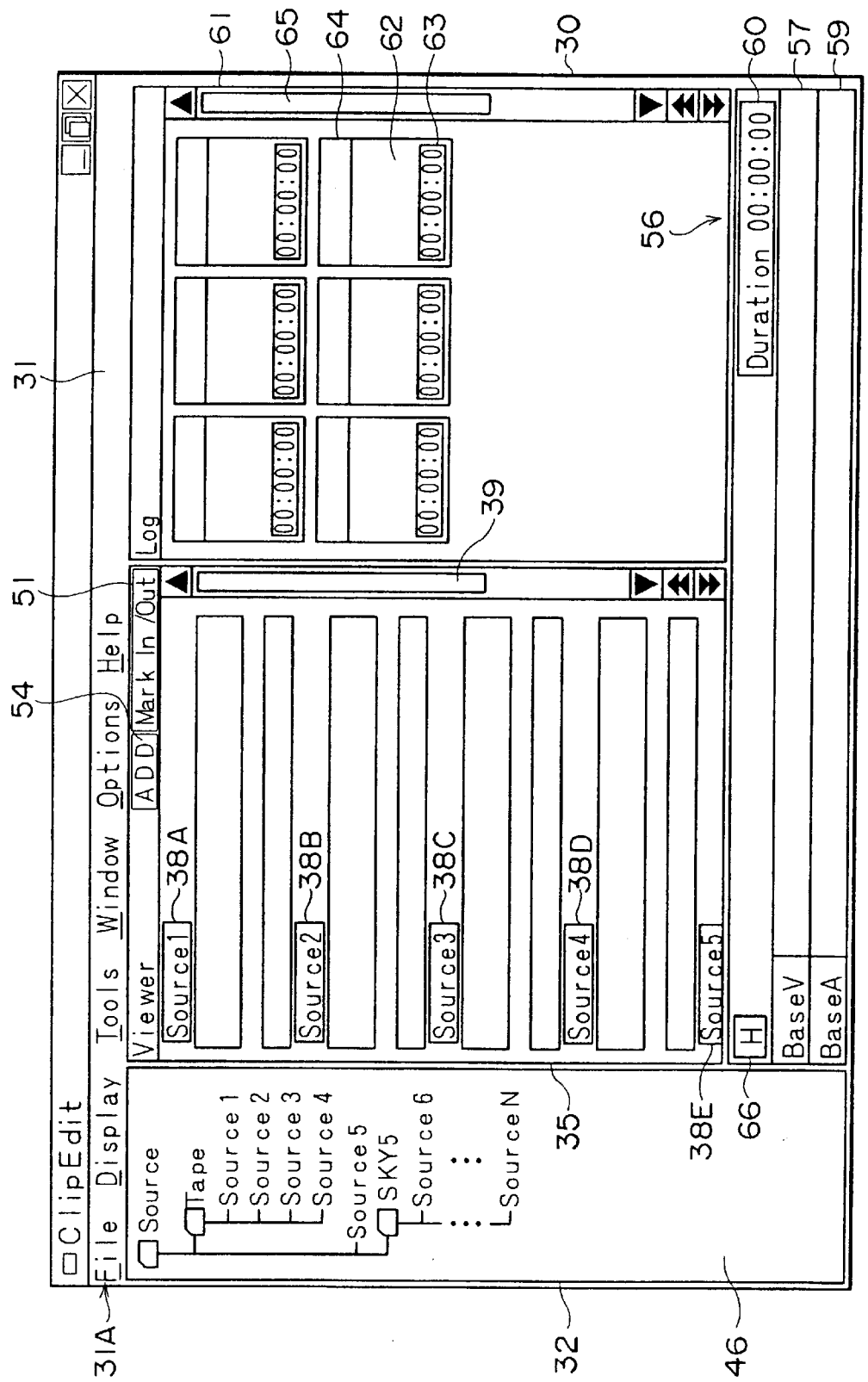
FIG. 3 is a schematic view showing a different editing screen of the video editing apparatus of FIG. 2.

The display video data stored in the third VRAM 24 are successively read out in a predetermined period and converted into analog data by a digital to analog conversion circuit 25, and the analog data thus converted are sent out to a monitor 26. As a result, such an editing screen 30 as a graphical user interface as shown in FIG. 3 is displayed on the monitor 26. On the editing screen 30, a cursor (not shown) is displayed which moves in the editing screen 30 in response to an operation of the mouse 12 under the control of the image processor 21.

Figure 4:
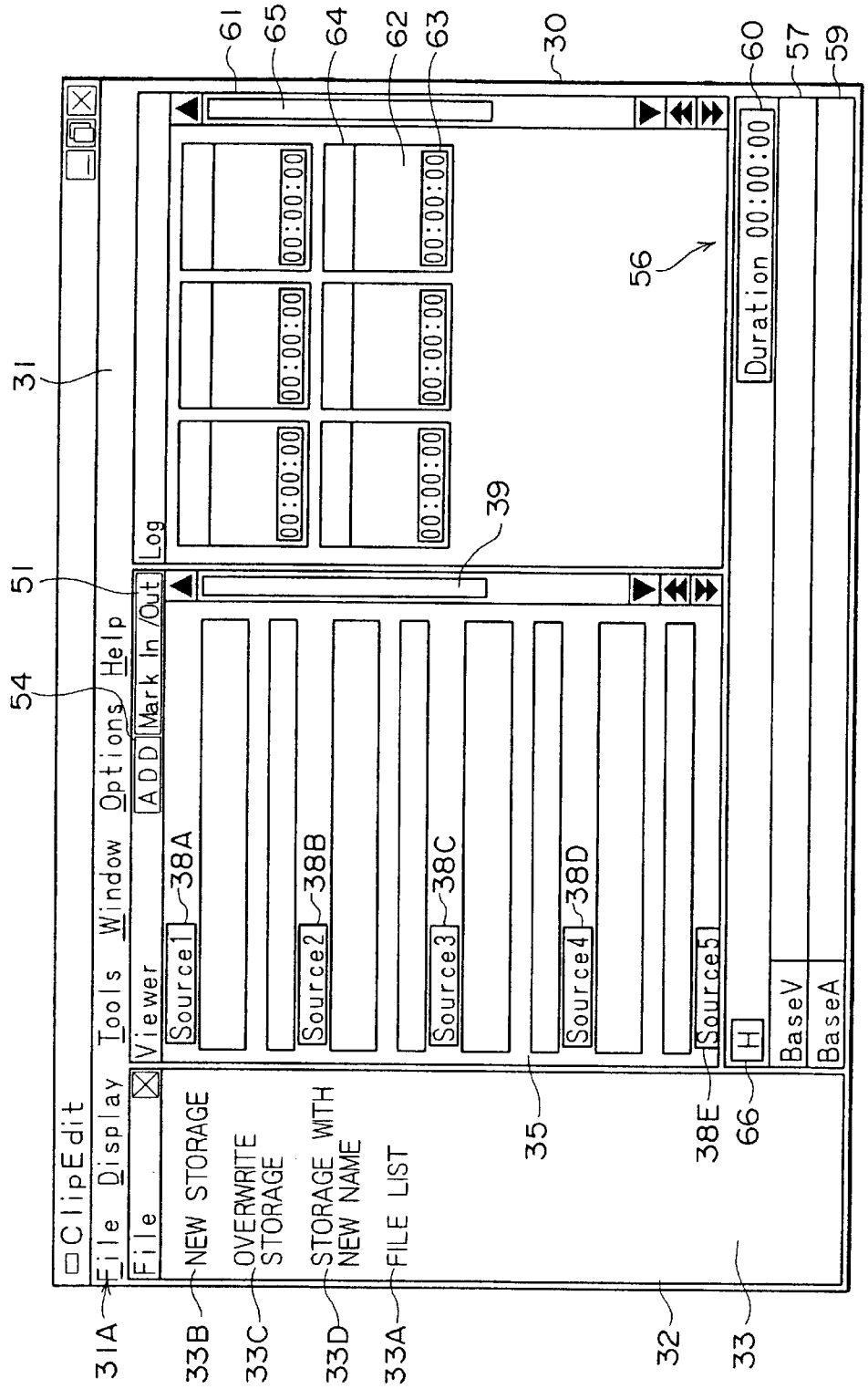
FIG. 4 is a schematic view showing a different editing screen of the video editing apparatus of FIG. 2.

On the editing screen 30, a menu bar 31 is displayed at an upper stage, and when the mouse 12 is clicked with the cursor placed on a file selection area 31A of the menu bar 31, a file selection menu 33 is displayed in a file directory window 32 as shown in FIG. 4.

When, in this condition, the mouse 12 is clicked with the cursor placed on a file list selection area 33A of the file selection menu 33, then data (hereinafter referred to as file name data) of file names of a plurality of video data files stored in the external storage apparatus 22 are read out and supplied to the image processor 21.

The image processor 21 produces display video data based on the file name data and sends out the display video data to the third VRAM 24 so that they are stored into the third VRAM 24.

Figure 5:
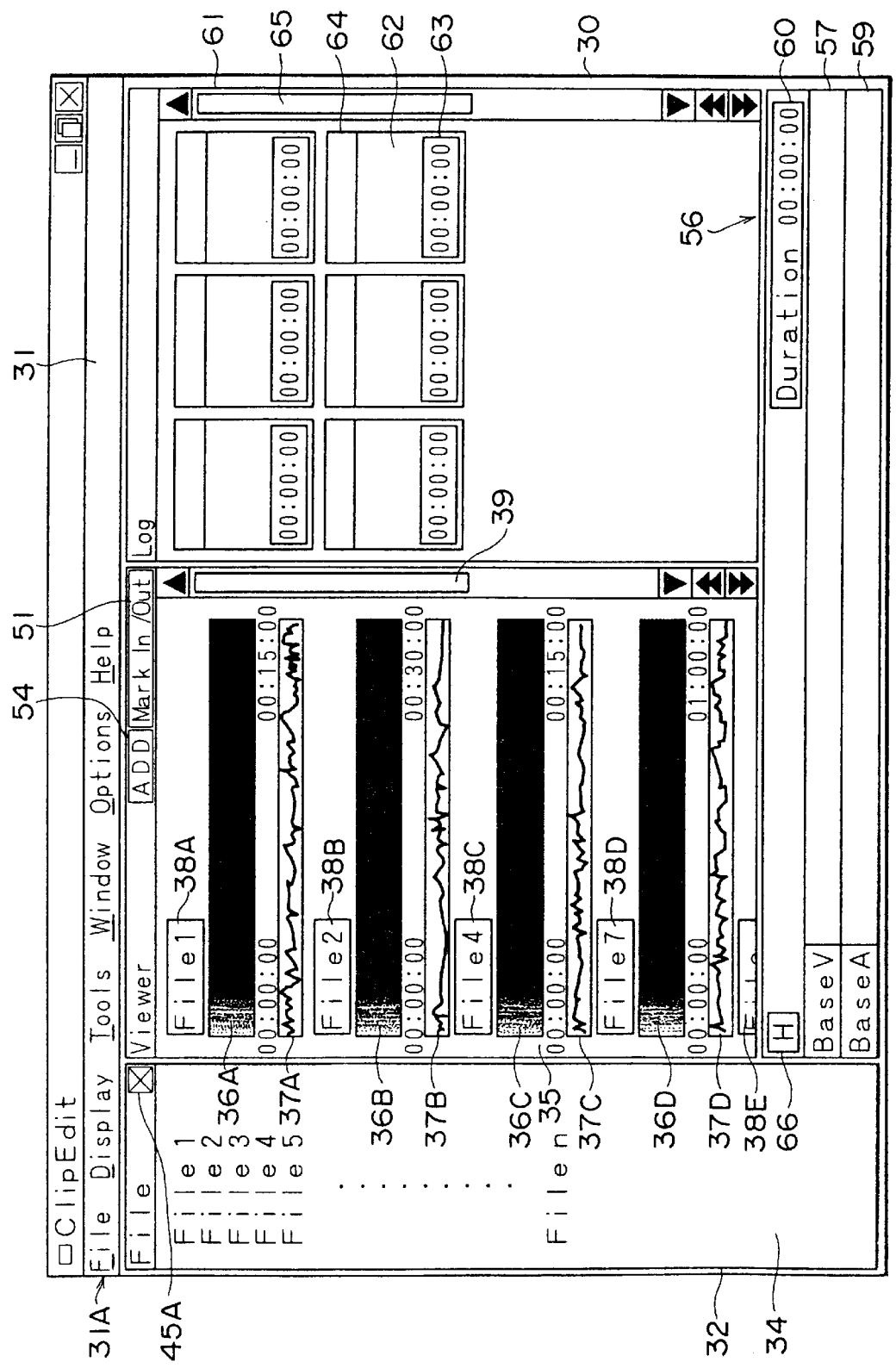
FIG. 5 is a schematic view showing a different editing screen of the video editing apparatus of FIG. 2.

On the editing screen 30, a file list 34 including the file names of the plurality of video data files is displayed in the file directory window 32 as shown in FIG. 5. Thus, any of the plurality of source video sequences can be selectively designated by selectively designating one of the file names of the file list 34.

When a plurality of source video sequences as an object of editing are selectively designated, then video data of corresponding video browsers and waveform data of corresponding audio waveforms are read out from the external storage apparatus 22 and are supplied to the image processor 21 over the system bus 14.

In the image processor 21, a reduced screen data formation section 21H thins out the video data of the video browsers supplied thereto to produce reduced video data of the video browsers and thins out the waveform data of the audio waveforms supplied thereto to produce reduced waveform data of the audio waveforms. Then, the reduced screen data formation section 21H produces display video data based on the video data and the waveform data thus produced and sends out the display video data to the third VRAM 24 so that they are stored into the third VRAM 24.

As a result, on the editing screen 30, video browsers 36A to 36D corresponding to the designated source video sequences are displayed in a plurality of stages in a video browser window 35, audio waveforms 37A to 37D corresponding to the video browsers 36A to 36D in the time base direction and time codes of the tops and the last ends of the video browsers 36A to 36D are displayed below the video browsers 36A to 36D, respectively. Further, corresponding file names of the video data files are displayed in file name display sections 38A to 38E provided at left upper positions to the video browsers 36A to 36D, respectively.

Incidentally, on the editing screen 30, a scroll bar 39 in the video browser window 35 is operated by the mouse, so that the video browsers 36A to 36D and so forth can be scrolled to display a portion of the video browsers 36A to 36D, which is not displayed then in the video browser window 35.

Figure 6:
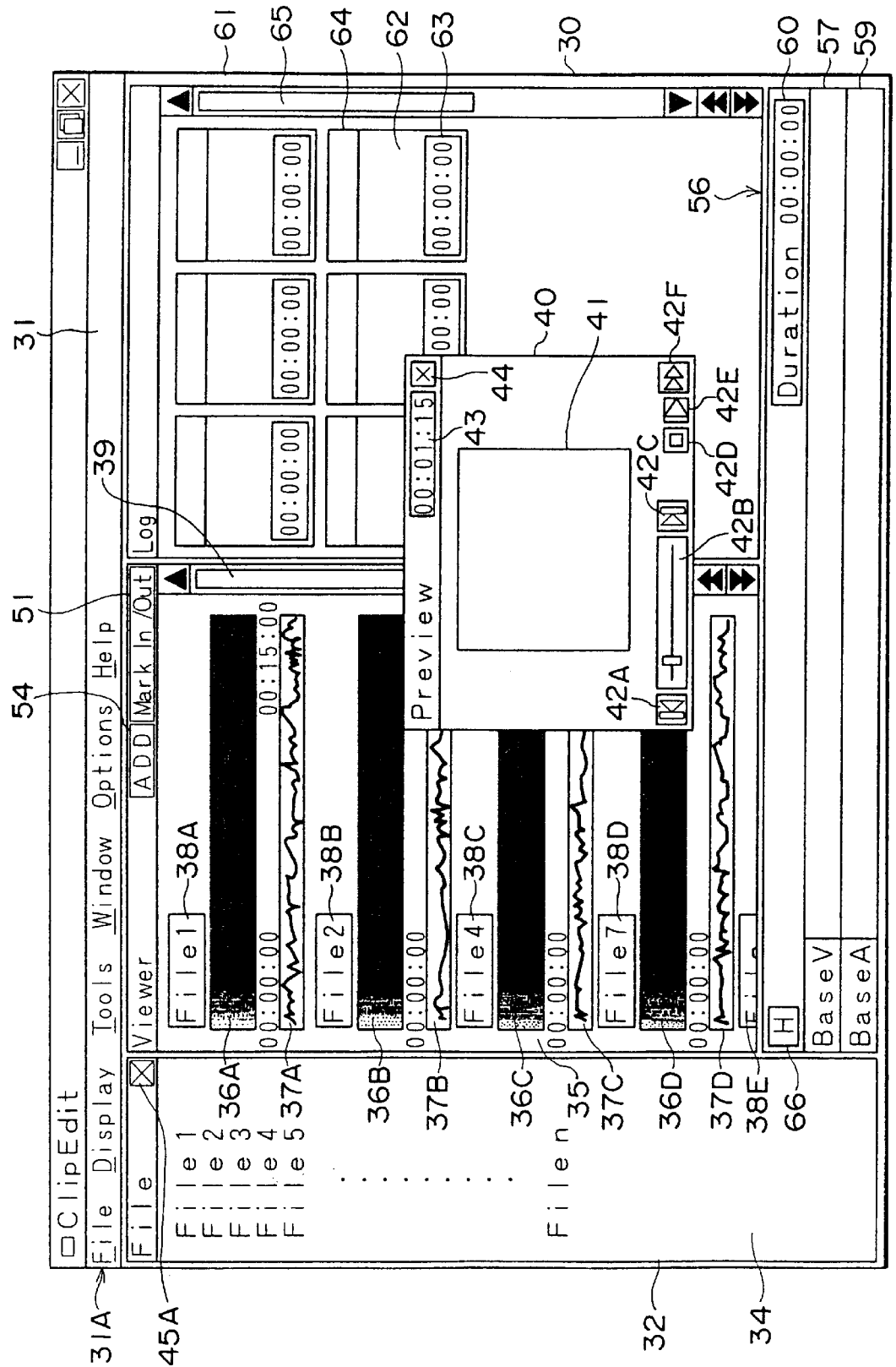
FIG. 6 is a schematic view showing a different editing screen of the video editing apparatus of FIG. 2.

Further, on the editing screen 30, by clicking the mouse 12 with the cursor placed at any arbitrary position of the video browsers 36A to 36D, a material preview window 40 is displayed in the editing screen 30 as seen in FIG. 6. Further, a frame image of a time code at the designated arbitrary position of the video browsers 36A to 36D is displayed in a material display window 41 of the material preview window 40.

When, in this condition, the mouse 12 is clicked with the cursor placed at one of a first frame feeding button 42A, a still reproduction button 42B, a second frame feeding button 42C, a stop button 42D, a normal reproduction button 42E and a video browser reproduction button 42F in the material preview window 40, then the video editing apparatus 10 can instruct the external storage apparatus 22 to execute a corresponding operation (frame feeding in the rewinding direction, still reproduction in the rewinding direction and the normal reproduction direction, frame feeding in the normal reproduction direction, stopping, normal reproduction, or fast reproduction) beginning with a frame image at the arbitrarily designated position.

At that time, a time code of the frame image is displayed in a time code display section 43 in the material preview window 40, while the time code simultaneously changes on display in response to a reproduction operation.

Incidentally, when the normal reproduction button 42E is clicked, corresponding video data D1 are reproduced and a video sequence based on the video data D1 is displayed at a normal reproduction speed in the material display window 41. When the video browser reproduction button 42F is clicked, then successive images for one screen of corresponding one of the video browsers 36A to 36D are successively reproduced to display successive images (which are hereinafter referred to as video browser images) of the particular one of the video browsers 36A to 36D in the material display window 41. Consequently, the source video sequence can be reproduced at a high speed corresponding to the number of vertical slit 3 (FIG. 1) which form one screen of the particular one of the video browsers 36A to 36D.

Further, on the editing screen 30, the material preview window 40 can be closed by clicking the mouse 12 with the cursor placed on a close button 44 in the material preview window 40.

Figure 7:
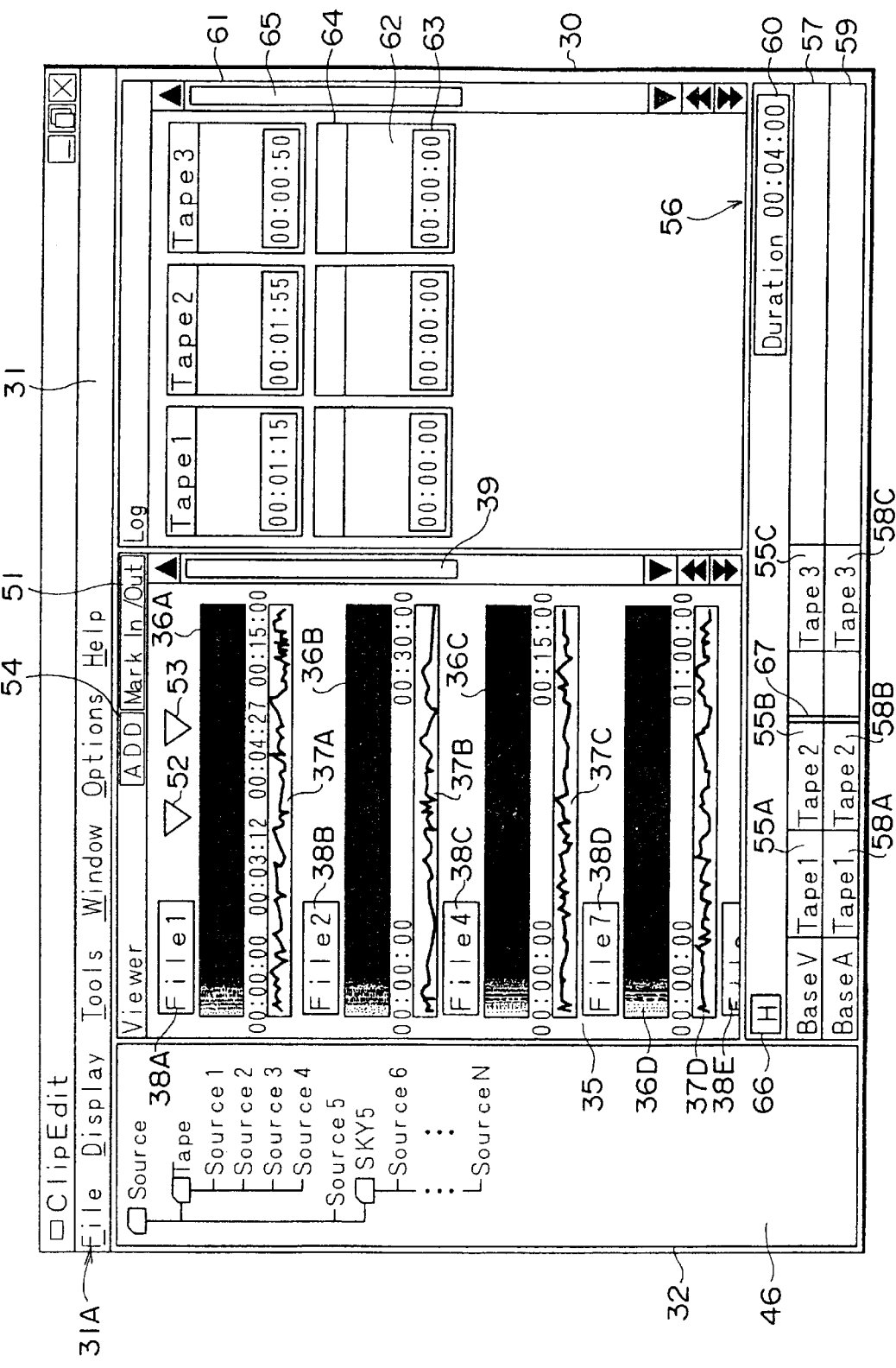
FIG. 7 is a schematic view showing a different editing screen of the video editing apparatus of FIG. 2.

Incidentally, by clicking the mouse 12 with the cursor placed on a close button 45 of the file list 34 on the editing screen 30, the file list 34 can be closed while a material selection menu 46 is displayed in the file directory window 32 as shown in FIG. 7, such that any of the video browsers 36A to 36D in the video browser window 35 can be selectively designated for reproduction through a source designation area (Source1 to SourceN in FIG. 7) in the material selection menu 46.

When the mouse 12 is clicked with the cursor actually placed on anywhere in the source designation areas in the material selection menu 46, then the material preview window 40 is displayed in the editing screen 30 and a top image for one screen of a designated one of the video browsers 36A to 36D in the video browser window 35 which corresponds to the designated source designation area is displayed in the material display window 41. When the mouse 12 is clicked in this condition with the cursor placed on the first frame feeding button 42A, still reproduction button 42B, second frame feeding button 42C, stop button 42D, normal reproduction button 42E or video browser reproduction button 42F similarly as described above, the video editing apparatus 10 can instruct the external storage apparatus 22 to execute a corresponding operation, and consequently, an image or a video sequence of the designated browser can be reproduced from the beginning with the top thereof.

Further, upon reproduction of a source video sequence described above, corresponding compression coded audio data D2 are reproduced from the external storage apparatus 22 and sent out to the image processor 21, by which they are decoded. Resulting audio data D2 are sent out through the system bus 14 to the digital to analog conversion circuit 48, by which they are converted into analog data. Audio signals S3A to S3N and S4A to S4N obtained by the analog conversion are sent out to a speaker 49, so that sound based on the corresponding one of the audio signals S3A to S3N and S4A to S4N is outputted from the speaker 49.

Incidentally, upon reproduction of the audio data D2, the audio data D2 are reproduced normally or reproduced fast in response to the settings of a source video sequence, either normal reproduction or fast reproduction.

In this manner, in the video editing apparatus 10, it is possible to designate a plurality of source video sequences of an object of editing to display corresponding video browsers 36A to 36D on the monitor 26 and cause a motion picture or a video browser image corresponding to any one of the designated source video sequences to be displayed when necessary.

On the other hand, when the mouse 12 is clicked with the cursor placed on a mark-in/out button 51 of the video browser window 35 on the editing screen 30, then the video editing apparatus 10 enters an editing mode.

In this condition, by clicking the left button of the mouse 12 with the cursor placed at a desired first position of the video browsers 36A to 36D, a mark-in point can be designated, and by clicking the right button of the mouse 12 with the cursor placed at a desired second position (further rightwardly than the first position) of the video browsers 36A to 36D, a mark-out point can be designated.

On the editing screen 30, a mark-in cursor 52 and a mark-out cursor 53 are displayed at positions designated as the mark-in point and the mark-out position, respectively, and time codes of the mark-in point and the mark-out point are displayed below the designated one of the video browsers 36A to 36D.

When, in this condition, the mouse 12 is clicked with the cursor placed on an add button 54 in the video browser window 35, then a portion designated by the mark-in point and the mark-out point as described above is determined as a video clip and sound corresponding to this is determined as an audio clip.

On the editing screen 30, frameworks 55A to 55C corresponding to the lengths of the video clips determined in this manner are displayed on a base video time line 57 of a time line window 56, and frameworks 58A to 58C of the audio clips are displayed on a base audio time line 59 in a corresponding relationship. Further, the total length of all of the video clips displayed on the base video time line 57 are displayed in the form of a time code in a duration display section 60 of the time line window 56.

Further, on the editing screen 30, frame images (frame images of time codes at the mark-in points) at the tops of the determined video clips are displayed in clip windows 62 of a clip display window 61 as shown in FIG. 8, and the length of each of the video clips is displayed in the form of a time code on a duration display section 63 in the clip window 62, respectively.

Furthermore, when a clip name for a video clip is inputted through the keyboard 11 then, it is displayed on a clip name display section 64, and at the same time, such clip names are displayed also in the frameworks 55A to 55C and 58A to 58C of the corresponding video clips and audio clips in the time line window 56.

Incidentally, on the editing screen 30, by operating a scroll bar 65 in the clip display window 61 using the mouse 12, the clip windows 62 can be scrolled so that the clip windows 62 at a portion which is not displayed then can be displayed in the clip display window 61.

Further, on the editing screen 30, the frameworks 55A to 55C and 58A to 58C for the video clips and the audio clips are successively displayed in a determined order from the left ends to right in the base video time line 57 and the base audio time line 59 of the time line window 56, respectively.

The frameworks 55A to 55C and 58A to 58C of the video clips and the audio clips displayed in the time line window 56 can be arranged in a desired order by changing positions in response to an operation of the mouse 12 called drag-and-drop. Thereupon, in response to the movement, also the positions of the other frameworks 55A to 55C and 58A to 58C are moved. Consequently, the order of the plurality of video clips and the corresponding audio clips can be decided arbitrarily.

Then, on the editing screen 30, when the mouse 12 is clicked with the cursor placed on a time cursor home position button 66 in the time line window 56, a bar-like time cursor 67 is displayed at the left ends of the base video time line 57 and the base audio time line 59 such that it extends across the base video time line 57 and the base audio time line 59, and the material preview window 40 described hereinabove is displayed. Further, a top one of browser images for one screen corresponding to one of the plurality of video clips displayed on the base video time line 57 which is positioned at the leftmost position is displayed in the material display window 41.

In this condition, when the external storage apparatus 22 executes a reproduction operation similarly as described above, motion pictures or video browser images and audio clips corresponding to the plurality of video clips displayed on the time line window 56 are successively reproduced. Further, in tandem with the reproduction operation, the time cursor 67 is moved rightwardly or leftwardly on the base video time line 57 and the base audio time line 59 so that it indicates the reproduction position of the video clip being reproduced and a corresponding audio clip.

In this manner, when the video editing apparatus 10 is in the editing mode, by designating a mark-in point and a mark-out point, a video clip and a corresponding audio clip can be produced successively, and motion pictures or video browser images in accordance with such video clips as produced in this manner can be displayed when necessary so that the video clips are confirmed by visual confirmation.

On the editing screen 30, when the mouse 12 is clicked with the cursor placed on the file selection area 31A of the menu bar 31, the file selection menu 33 (FIG. 4) is displayed on the file directory window 32.

When, in this condition, the mouse 12 is clicked with the cursor placed on a new storage designation area 33B, an overwrite storage designation area 33C or a new name storage designation area 33D in the file selection menu 33, a list (hereinafter referred to as editing list) of various information such as clip names of the video clips and corresponding audio clips produced then, time codes of the mark-in points and the mark-out points, the order on the time line is supplied to the external storage apparatus 22 so that it is stored in accordance with a corresponding storage method into the external storage apparatus 22.

Thus, in the video editing apparatus 10, by thereafter reading out the editing list from the external storage apparatus 22 when necessary and successively reading out corresponding video clips and audio clips from the external storage apparatus 22 in accordance with the thus read out editing list, motion pictures and sound corresponding to the video clips and the audio clips thus read out can be used for broadcasting, for example.

3. Various Processes of Host Computer
3-1. Editing Processing Procedure

Such operations in the displaying mode and the editing mode as described above are all executed under the control of the host computer 15 (FIG. 2).

Figure 9:
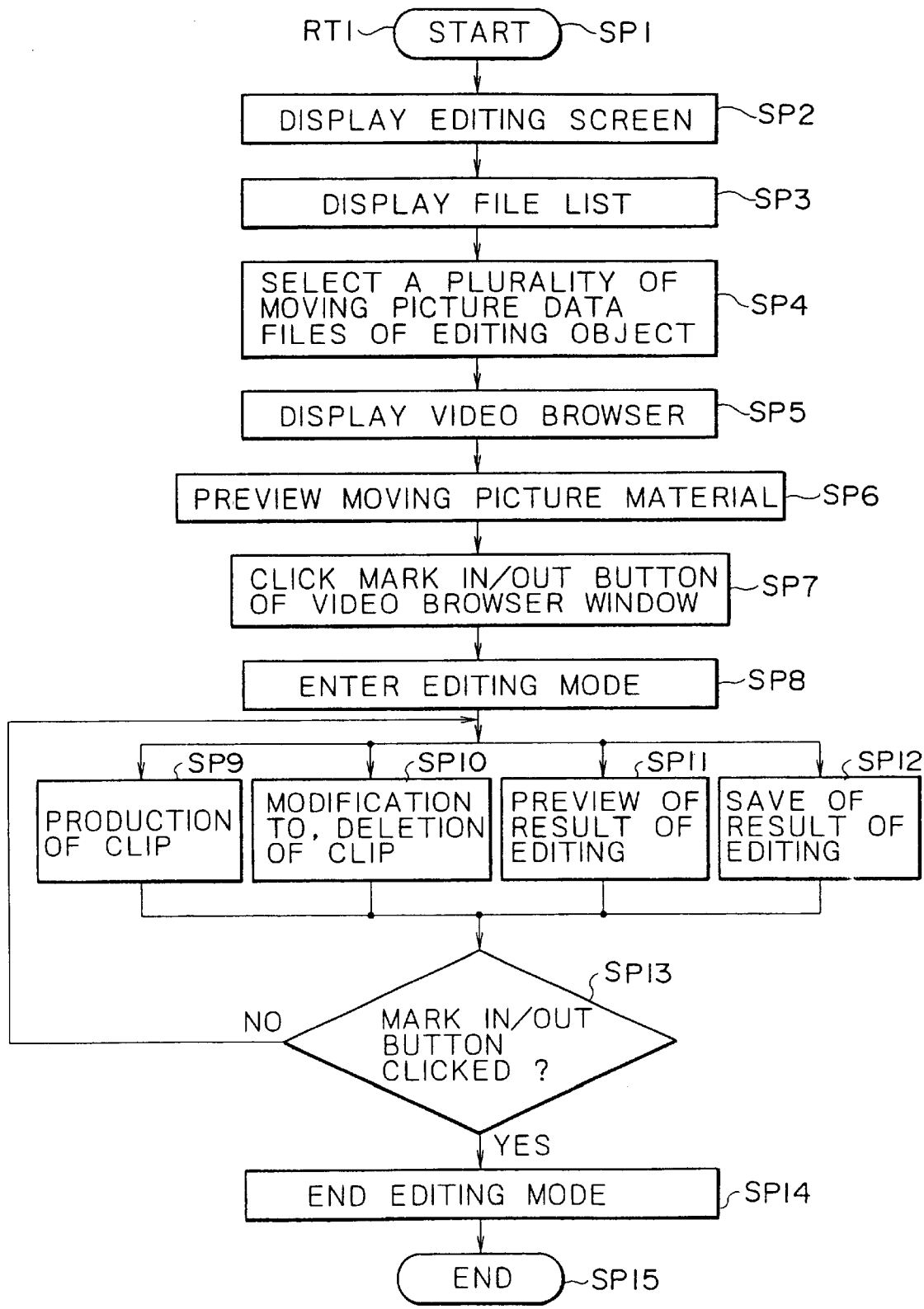
FIG. 9 is a flow chart illustrating an editing processing procedure of the video editing apparatus of FIG. 2.

Actually, when the video editing apparatus 10 is in the displaying mode, the host computer 15 starts an editing processing procedure RT1 illustrated in FIG. 9 in step SP1, and then in step SP2, controls the external storage apparatus 22 to read out corresponding video data therefrom, controls the image processor 21 to produce display video data based on the video data and write the video data into the third VRAM 24 and controls the monitor 26 to display the editing screen 30 (FIG. 3).

Then in step SP3, the host computer 15 controls, when it confirms that the mouse 12 is clicked with the cursor placed on the file selection area 31A of the menu bar 31, the external storage apparatus 22 to read out corresponding video data therefrom, controls the image processor 21 to produce display video data, and writes the display video data into the third VRAM 24 so that the editing screen 30 (FIG. 4) in which the file selection menu 33 is displayed is displayed on the monitor 26.

In this condition, when the host computer 15 confirms that the mouse 12 is clicked with the cursor placed on the file list selection area 33A, then it controls the external storage apparatus 22 to read out file name data of a plurality of video data files therefrom, controls the image processor 21 to produce predetermined display video data based on the file name data and write the display video data into the third VRAM 24 so that the monitor 26 may display the editing screen 30 (FIG. 5) in which the file list 34 is displayed in the file directory window 32.

In this condition, when the mouse 12 is clicked with the cursor placed on one of the file name display sections 38A to 38E of the video browser window 35 and then the mouse 12 is double clicked with the cursor placed on a desired file name amongst the plurality of the file names of the file list 34, the host computer 15 controls the external storage apparatus 22 to search for a corresponding video data file in step SP4.

Then, when the corresponding video data file is detected, the host computer 15 advances its processing to step SP5, in which it controls the external storage apparatus 22 to read out video data of the corresponding video browser and waveform data of an audio waveform and controls the image processor 21 to produce predetermined display video data based on the video data and the waveform data and write the predetermined display video data into the third VRAM 24 so that one of the video browsers 36A to 36D, a corresponding one of the audio waveforms 37A to 37D, the file name and time codes of the top and the last end of the one of the video browsers 36A to 36D are displayed on the editing screen 30. In this manner, each time a desired file name is designated, a corresponding one of the video browsers 36A to 36D and so forth are displayed on the video browser window 35. Consequently, the plurality of video browsers 36A to 36D and so forth can be displayed.

Then, the host computer 15 advances its control to step SP6, in which, when it confirms that the mouse 12 is clicked with the cursor placed at an arbitrary position of the video browsers 36A to 36D, the host computer 15 controls the external storage apparatus 22 to read out video data of a frame image of a time code at the clicked position of the video browsers 36A to 36D therefrom, controls the image processor 21 to produce display video data based on the video data and write the display video data into the third VRAM 24 so that the material preview window 40 is displayed in the editing screen 30 and the frame image of the time code at the clicked position of the video browsers 36A to 36D is displayed on the material display window 41.

In this condition, when the mouse 12 is clicked with the cursor placed on one of the first frame feeding button 42A, still reproduction button 42B, second frame feeding button 42C, stop button 42D, normal reproduction button 42E and video browser reproduction button 42F, then the host computer 15 controls the external storage apparatus 22 to perform a corresponding operation so that the corresponding source video sequence and audio material are reproduced from the designated position.

Then, the host computer 15 advances the control to step SP7, in which it confirms that the mouse 12 is clicked with the cursor placed on the mark-in/out button 51 of the video browser window 35. When it is confirmed, then the host computer 15 advances the control to step SP8, in which the video editing apparatus enters an editing mode.

In this condition, when the host computer 15 confirms in step SP9 that the left or right button of the mouse 12 is clicked with the cursor placed at an arbitrary position of the video browsers 36A to 36D, then it produces a video clip and a corresponding audio clip based on information designated using the mouse 12.

On the other hand, when the host computer 15 confirms in step SP10 after production of the video clip and corresponding audio clip that the button of the mouse 12 is pressed with the cursor placed on the mark-in cursor 52 or the mark-out cursor 53, the host computer 15 changes or deletes the video clip and the corresponding audio clip based on information designated using the mouse 12 and the keyboard 11 subsequently.

However, when the host computer 15 confirms in step SP11 after production of the video clip and corresponding audio clip that the mouse 12 is clicked with the cursor placed on the time cursor home position button 66 of the time line window 56, it causes all of the video clips and the corresponding audio clips displayed in the time line to be successively reproduced based on information designated using the mouse 12 subsequently.

On the other hand, when the host computer 15 confirms in step SP12 after production of the video clip and corresponding audio clip that the mouse 12 is clicked with the cursor placed on the file selection area 31A of the menu bar 31, then it stores an editing list regarding the video clip and the corresponding audio clip based on information designated subsequently using the mouse 12.

Thereafter, the host computer 15 advances its control to SP13, in which it determines whether or not the mouse 12 is clicked with the cursor placed on the mark-in/out button 51 of the video browser window 35 again.

A negative result in step SP13 signifies that the editing processing for the source video sequences of the object of editing has not been completed as yet. In this instance, the host computer 15 returns to step SP9, SP10, SP11 and/or SP12. Consequently, the host computer 15 repeats the processing in steps SP9, SP10, SP11 and/or SP12 until an affirmative result is obtained in step SP13.

An affirmative result in step SP13 signifies that the sequence of editing processing for the source video sequences of the object of editing are completed. In this instance, the host computer 15 advances its control to step SP14, in which the editing mode is ended, whereafter it advances the control to step SP15, in which the editing processing procedure RT1 is ended.

3-2. Material Reproduction Processing Procedure

Figure 10:
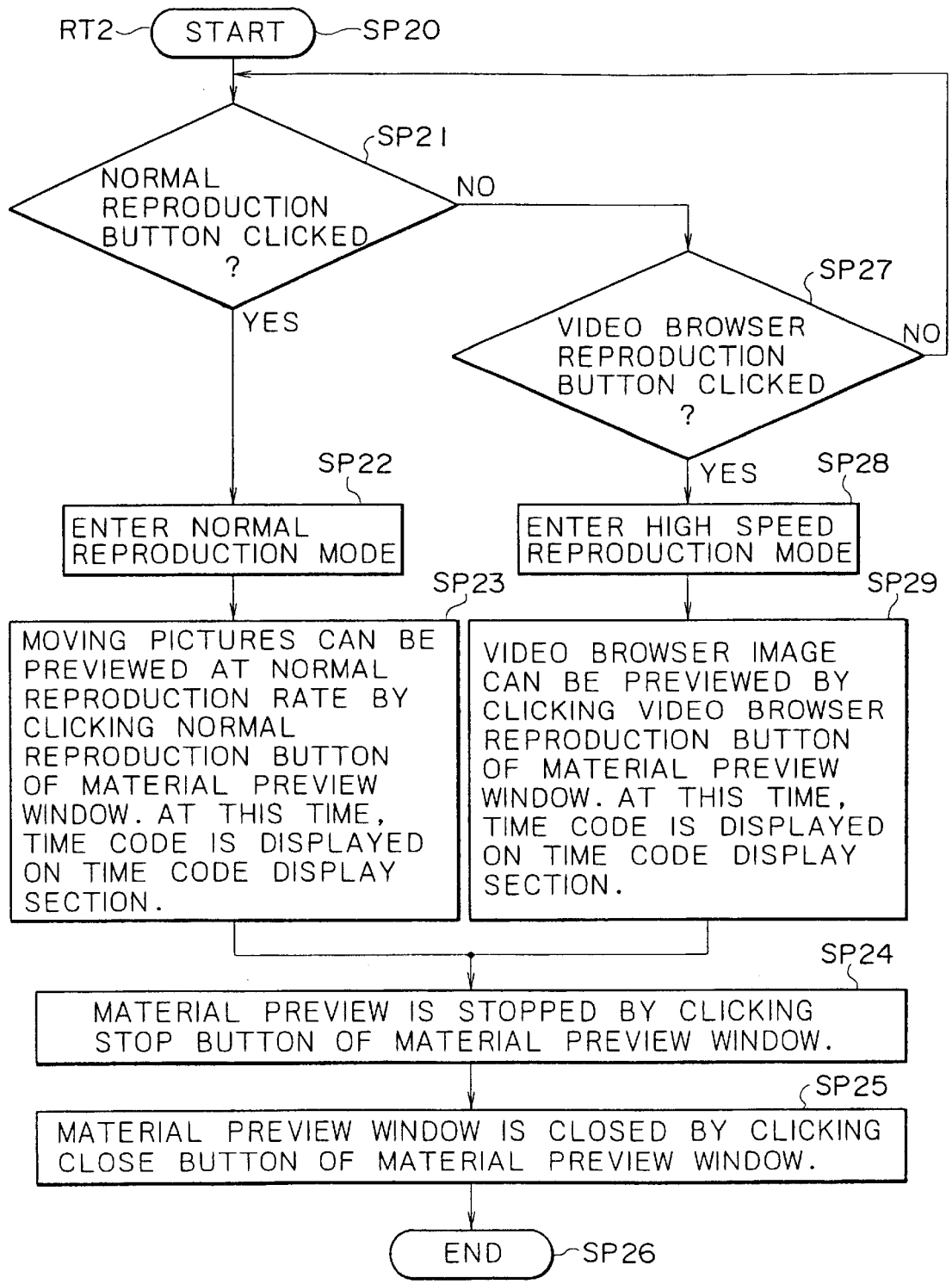
FIG. 10 is a flow chart illustrating a material playback processing procedure of the video editing apparatus of FIG. 2.

In step SP6 of the editing processing procedure RT1 described above, the host computer 15 actually executes a material reproduction processing procedure RT2 illustrated in FIG. 10. Referring to FIG. 10, the host computer 15 starts the material reproduction processing procedure RT2 first in step SP20. Then, the host computer 15 advances the control to step SP21, in which it determines whether or not the mouse 12 is clicked with the cursor placed on the normal reproduction button 42E.

When an affirmative result is obtained in step SP21, then the host computer 15 advances the control to step SP22, in which a normal reproduction mode is entered.

In this condition, the host computer 15 advances the control to step SP23, in which it controls the external storage apparatus 22 to read out corresponding compression coded video data D1, supplies the video data D1 to the image processor 21 so that they may be decoded by the image processor 21, controls the reduced screen data formation section 21H to produce display video data based on the resulting video data D1, and writes the display video data into the third VRAM 24 so that a motion picture based on the video data D1 is displayed at a normal reproduction rate in the material display window 41 of the material preview window 40 on the editing screen 30 and a time code added to the video data D1 is displayed on the time code display section 43.

In this instance, when the mouse 12 is clicked with the cursor placed on the first frame feeding button 42A, still reproduction button 42B or second frame feeding button 42C in addition to the normal reproduction button 42E, the host computer 15 controls the external storage apparatus 22 to execute a corresponding operation.

Incidentally, the host computer 15 thereupon controls the external storage apparatus 22 to read out corresponding compression coded audio data D2 and supply the audio data D2 to the image processor 21 so that the audio data D2 are decoded by the image processor 21. Then, the host computer 15 controls the digital to analog conversion circuit to convert the thus obtained audio data D2 into an audio signal S3A to S3N or S4A to S4N and send out the resulting signal to the speaker 49 so that sound based on the audio signal S3A to S3N or S4A to S4N is outputted from the speaker 49.

Then, when the host computer 15 soon confirms in step SP24 that the mouse 12 is clicked with the cursor placed on the stop button 42D, the host computer 15 controls the external storage apparatus 22 to stop the reading out of the compression coded video data D1 and then to read out predetermined video data. The video data are supplied to the image processor 21, by which display video data are produced based on the video data. The display video data are written into the third VRAM 24 so that the display of a motion picture in the material preview window 40 is stopped.

Thereafter, when the host computer 15 confirms in step SP25 that the mouse 12 is clicked with the cursor placed on the close button 44 of the material preview window 40, then the host computer 15 controls the external storage apparatus 22 to read out predetermined video data and supply them to the image processor 21, by which display video data are produced from the video data. The display video data are written into the third VRAM 24 so that the editing screen 30 (FIG. 5) on which the material preview window 40 is closed is displayed on the monitor 26. Thereafter, the host computer 15 advances the control to step SP26, in which the material reproduction processing procedure RT2 is ended.

On the other hand, when the host computer 15 obtains a negative result in step SP21 described above, then the control thereof advances to step SP27, in which it is determined whether or not the mouse 12 is clicked with the cursor placed on the video browser reproduction button 42F.

Then, when the host computer 15 obtains a negative result in step SP27, then it returns the control to step SP21 so that the processing in steps SP21-SP27-SP21 is repeated until an affirmative result is obtained in step either SP21 or SP27.

When an affirmative result is obtained in step SP27, then the host computer 15 advances the control to step SP28, in which a fast reproduction mode is entered.

In this condition, the host computer 15 advances the control to step SP29, in which it controls the external storage apparatus 22 to read out video data of a corresponding video browser and supply the video data to the image processor 21 so that display video data are produced from the display data by the reduced screen data formation section 21H. The display video data are written into the third VRAM 24 so that a video browser image is displayed in the material display window 41 of the material preview window 40, and a time code added to the video data D1 is successively displayed in a jumping over state in response to the video browser image on the time code display section 43.

In this instance, when the mouse 12 is clicked with the cursor placed on the first frame feeding button 42A, still reproduction button 42B or second frame feeding button 42C in addition to the video browser reproduction button 42F, then the host computer 15 controls the external storage apparatus 22 to execute frame feeding reproduction in the rewinding direction, still reproduction in the rewinding direction or the normal reproduction direction and/or frame feeding reproduction in the normal reproduction direction of the video browser image.

In this condition, the host computer 15 controls the external storage apparatus 22 to intermittently read out corresponding compression coded audio data D2 in response to the video browser image and supply the audio data D2 to the image processor 21 so that they are decoded by the image processor 21. Resulting audio data D2 are converted into a corresponding intermittent audio signal S3A to S3N or S4A to S4N by the digital to analog conversion circuit 48, and the resulting signal is sent out to the speaker 49 so that intermittent sound based on the audio signal S3A to S3N or S4A to S4N is produced from the speaker 49.

Then, the host computer 15 advances the control to step SP24, in which it waits until the mouse 12 is clicked with the cursor placed on the stop button 42D similarly as described hereinabove.

3-3. Clip Production Processing Procedure

Figure 11:
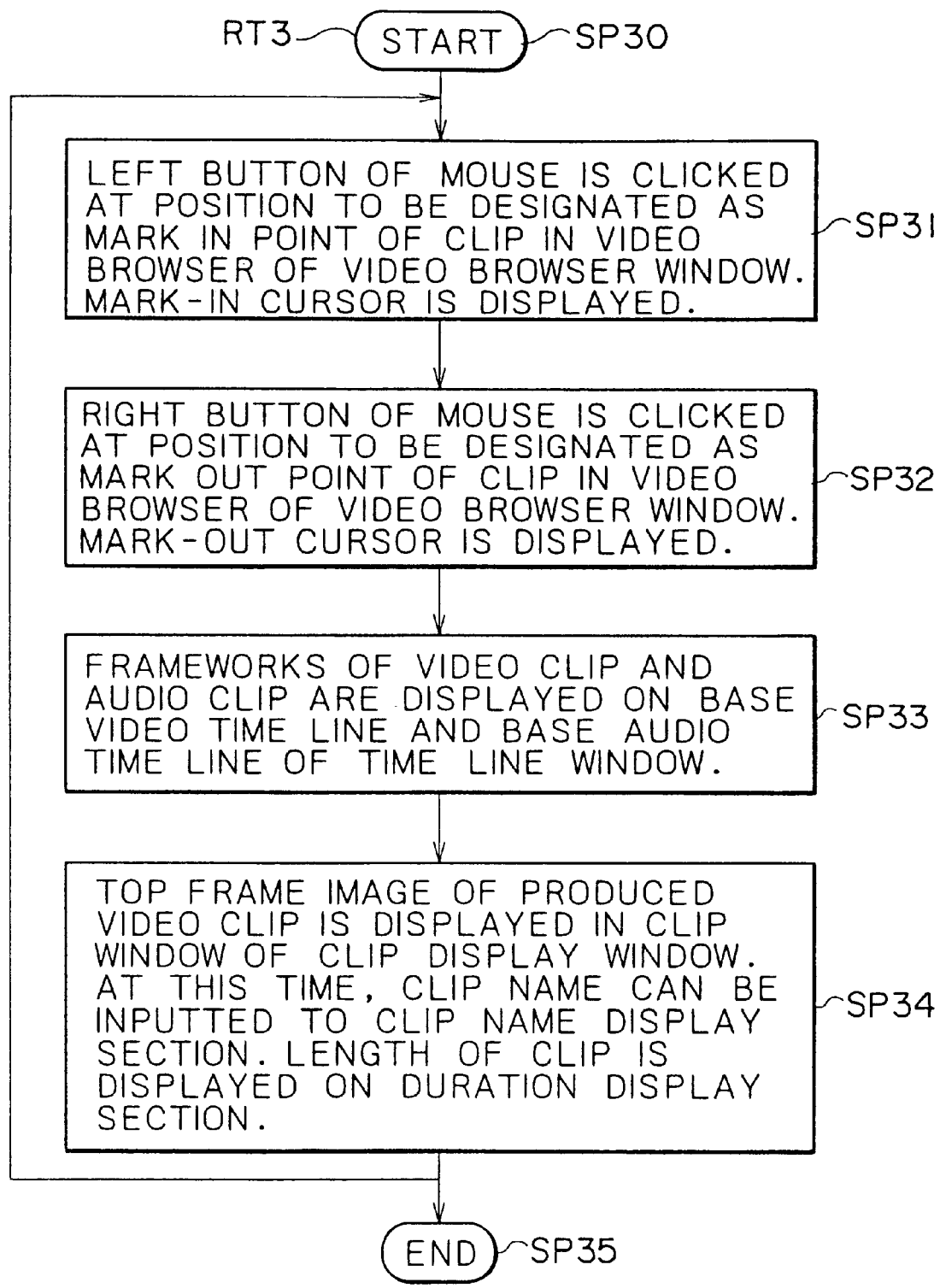
FIG. 11 is a flow chart illustrating a clip production processing procedure of the video editing apparatus of FIG. 2.

In step SP9 of the editing processing procedure RT1 described hereinabove, the host computer 15 executes a clip production processing procedure RT3 illustrated in FIG. 11. Referring to FIG. 11, the host computer 15 starts the clip production processing procedure RT3 first in step SP30, and then advances the control to step SP31, in which it determines, when it confirms that the left button of the mouse 12 is clicked with the cursor placed at a desired position of the video browsers 36A to 36D displayed in the video browser window 35, that a mark-in point is designated.

Then, the host computer 15 controls the external storage apparatus 22 to read out corresponding video data therefrom and controls the image processor 21 to produce display video data based on the video data. Further, the host computer 15 causes the display video data to be written into the third VRAM 24 so that the mark-in cursor 52 is displayed at the designated position of the corresponding one of the video browsers 36A to 36D of the video browser window 35 and a time code at the position designated as the mark-in point is displayed.

Then, the host computer 15 advances the control to step SP32 in which, when it confirms that the right button of the mouse 12 is clicked with the cursor placed at a desired position of the video browsers 36A to 36D displayed in the video browser window 35 on the editing screen 30, then the host computer 15 determines that a mark-out point is designated.

Then, the host computer 15 controls the external storage apparatus 22 to read out corresponding video data and controls the image processor 21 to produce display video data based on the video data and write the display video data into the third VRAM 24 so that the mark-out cursor 53 is displayed at the position designated by the corresponding one of the video browsers 36A to 36D of the video browser window 35 and a time code corresponding to the position designated as the mark-out point is displayed.

Then, the host computer 15 advances the control to step SP33 in which, when it confirms that the mouse 12 is clicked with the cursor placed on the add button 54 of the video browser window 35, it determines a portion of the display video data between the mark-in point and the mark-out point designated in steps SP31 and SP32 as a video clip and also determines a corresponding sound portion as an audio clip.

Then, the host computer 15 controls the external storage apparatus 22 to read out video data of a frame image of the time code at the designated mark-in point and time codes of the mark-in point and the mark-out point therefrom, and controls the image processor 21 to produce display video data based on the video data and the time codes and write the display video data into the third VRAM 24 so that a framework 55A to 55C corresponding to the video clip is displayed on the base video time line 57 and a framework 58A to 58C corresponding to audio clip is displayed on the base audio time line 59 while the total length of all of the video clips displayed in the time line window 56 is displayed in the form of a time code in the duration display section 60.

The host computer 15 then advances the control to step SP34, in which it causes the top frame image (frame image of the time code at the mark-in point) of the determined video clip to be displayed on a clip window 62 in the clip display window 61 and causes the length of the video clip to be displayed in the form of a time code on the corresponding duration display section 63 in the clip display window 61.

In addition, when the mouse 12 is clicked with the cursor placed on the corresponding clip name display section 64, the host computer 15 establishes a condition wherein a clip name of a corresponding video clip can be inputted. When a clip name is inputted from the keyboard 11 in this condition, then the host computer 15 controls the image processor 21 to produce display video data based on the inputted clip name and write the display video data into the third VRAM 24 so that the clip name is displayed on the corresponding clip name display section 64 in the clip display window 61. Thereafter, the host computer 15 advances the control to step SP35, in which it ends the clip production processing procedure RT3.

3-4. Clip Change and Deletion Processing Procedure

Figure 12:
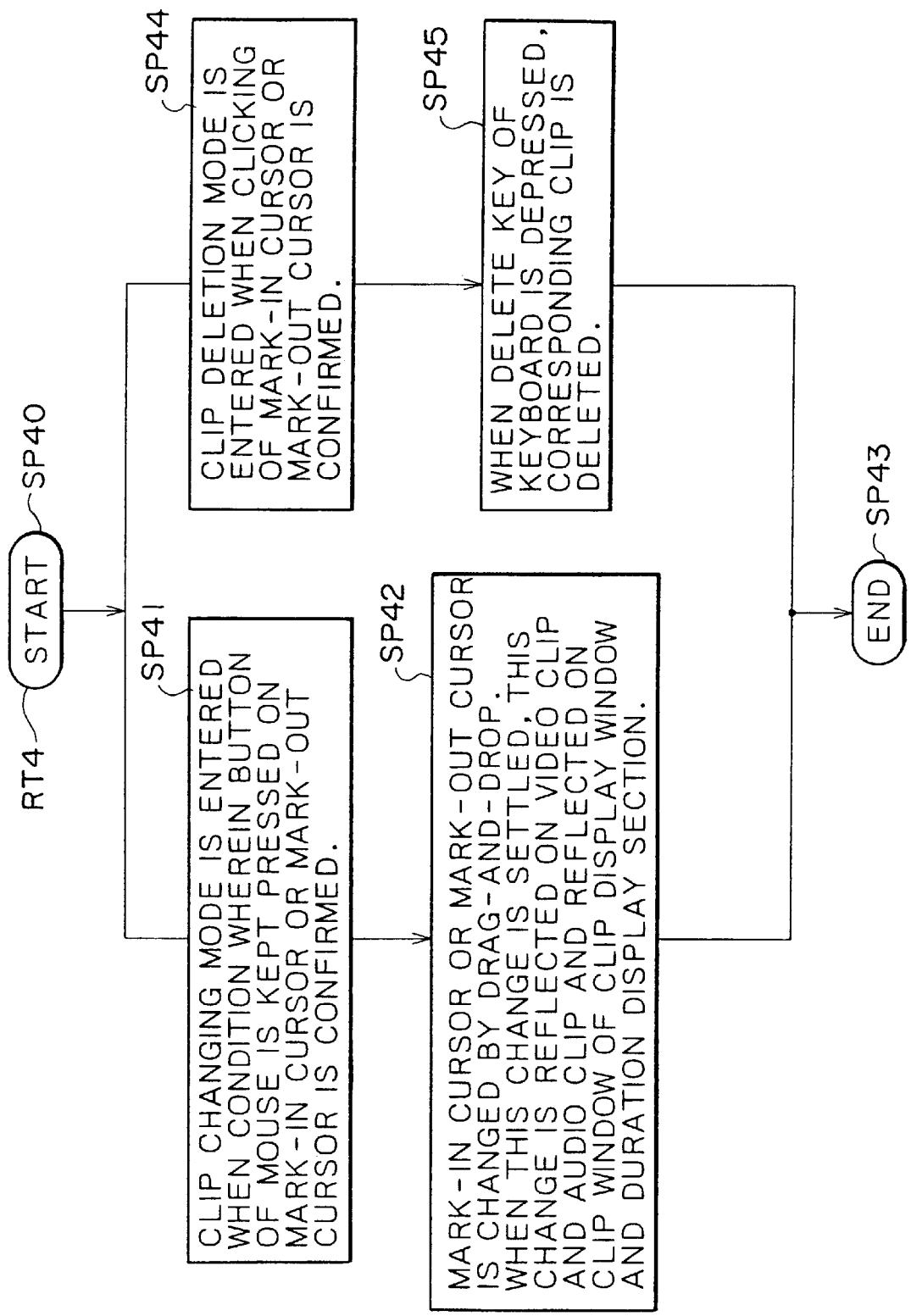
FIG. 12 is a flow chart illustrating a clip changing and deletion processing procedure of the video editing apparatus of FIG. 2.

In step SP10 of the editing processing procedure RT1 described hereinabove, the host computer 15 executes a clip change and deletion processing procedure RT4 illustrated in FIG. 12. Referring to FIG. 12, the host computer 15 starts the clip change and deletion processing procedure RT4 first in step SP40 and then advances the control to step SP41, in which, when it confirms the state wherein the button of the mouse 12 is kept pressed with the cursor placed on the mark-in cursor 52 or the mark-out cursor 53 displayed in the video browser window 35, then a clip changing mode is entered.

In this condition, the host computer 15 advances the control to step SP42, in which, when the cursor is moved while the button of the mouse 12 is kept pressed, it controls the external storage apparatus 22 and the image processor 21 in response to the movement of the cursor to move the designated mark-in cursor 52 or the mark-out cursor 53 following the cursor. Then, when the host computer 15 confirms that the button of the mouse 12 is released, the host computer 15 positions the mark-in cursor 52 or the mark-out cursor 53 at the position (drag-and-drop). The mark-in position or the mark-out position is changed in this manner.

Thereafter, when the mouse 12 is clicked with the cursor placed on the add button 54 of the video browser window 35, the host computer 15 determines changes in the contents, and controls the external storage apparatus 22 in response to the determined contents of the change to read out the time code of the changed mark-in point and the image data of the frame image or the time code of the changed mark-out point. Then, the host computer 15 controls the image processor 21 to produce display video data based on the time code of the mark-in point and the video data or based on the time code of the time-out point, and write the display video data into the third VRAM 24 so that the display of the time code corresponding to the mark-in point or mark-out point in the video browser window 35 is changed and the length of the frameworks 55A to 55C and 58A to 58C of the corresponding video clip and audio clip in the time line window 56 is changed and besides the display of the time code of the duration display section 60 is changed.

Further, the host computer 15 causes the frame image displayed in the corresponding clip window 62 of the clip display window 61 then to be changed to the frame image of the time code of the changed mark-in point and causes the display of the time code of the duration display section 63 to be changed.

Thereafter, the host computer 15 advances the control to step SP43, in which it ends the clip change and deletion processing procedure RT4.

On the other hand, when the host computer 15 confirms in step SP44 subsequently to step SP40 that the mouse 12 is clicked with the cursor placed on the mark-in cursor 52 or the mark-out cursor 53 displayed in the video browser window 35, a clip deletion mode is entered.

In this condition, the host computer 15 advances the control to step SP45, in which, when it confirms the delete key of the keyboard 11 is pressed, then it controls the external storage apparatus 22 and the image processor 21 in response to the delete key operation to delete a video clip and an audio clip designated by the mark-in cursor 52 or mark-out cursor 53, thereby deleting the corresponding mark-in cursor 52 or mark-out cursor 53 in the video browser window 35, the frameworks 55A to 55C and 58A to 58C of the corresponding video clip and audio clip in the time line window 56, the frame image of the time code at the corresponding mark-in point, the time code and the clip name in the clip display window 61. Thereafter, the host computer 15 advances the control to step SP43.

Incidentally, even if the host computer 15 confirms in step SP44 described hereinabove that the mouse 12 is clicked with the cursor placed on an arbitrary clip window 62 in which a frame image is displayed in the clip display window 61, a clip deletion mode is established. Then, when the host computer 15 confirms in step SP45 that the delete key of the keyboard 11 is pressed similarly as described above, then the host computer 15 deletes a corresponding video clip and audio clip.

3-5. Clip Reproduction Processing Procedure

Figure 13:
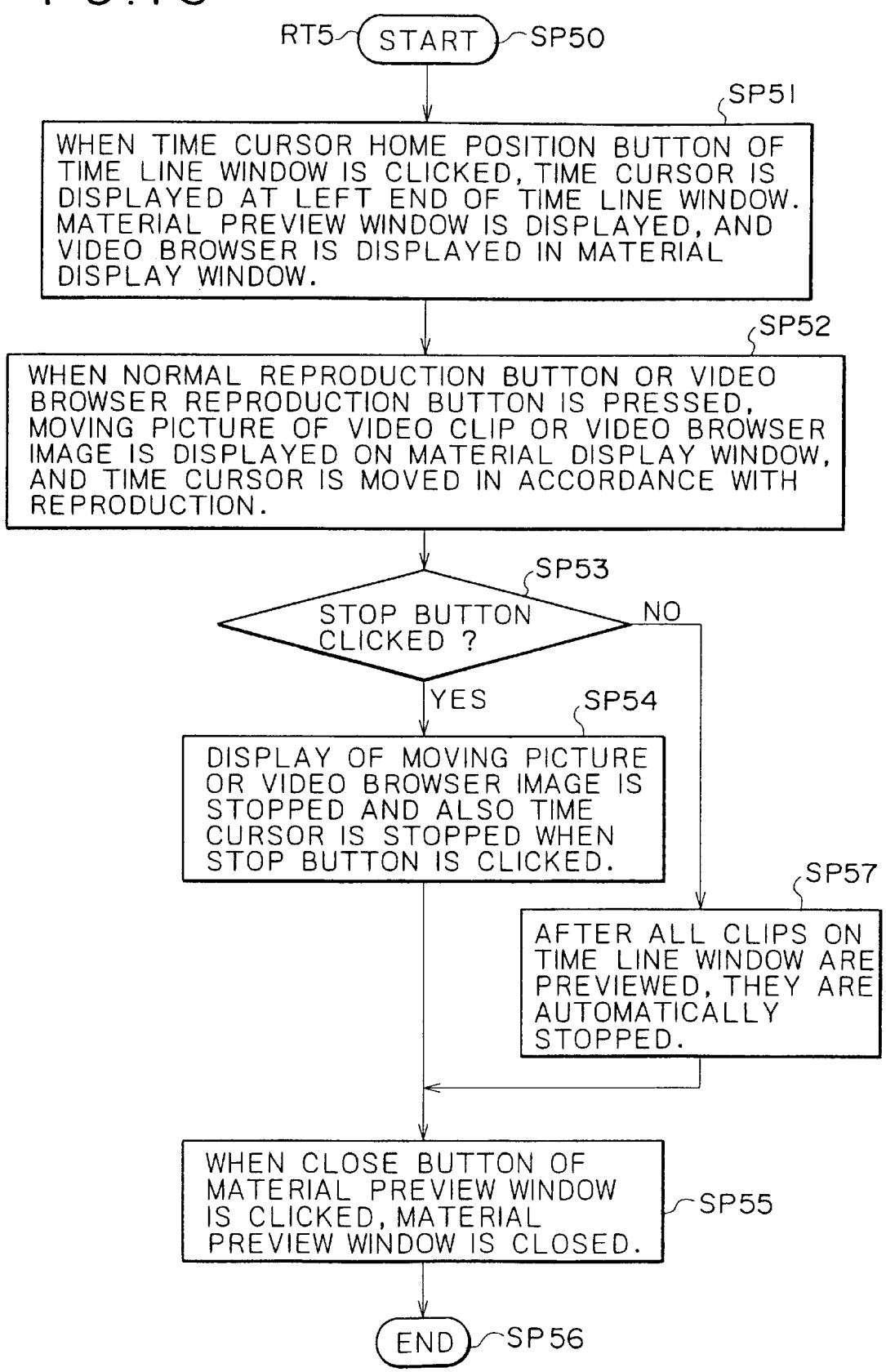
FIG. 13 is a flow chart illustrating a clip reproduction processing procedure of the video editing apparatus of FIG. 2.

In step SP11 of the editing processing procedure RT1 described hereinabove, the host computer 15 executes a clip reproduction processing procedure RT5 illustrated in FIG. 13. Referring to FIG. 13, the host computer 15 starts the clip reproduction processing procedure RT5 first in step SP50. Then, when the host computer 15 confirms in the next step SP51 that the mouse 12 is clicked with the cursor placed on the time cursor home position button 66 of the time line window 56, it controls the external storage apparatus 22 to read out video data for the top one screen of a video browser corresponding to the one positioned at the leftmost amongst the plurality of video clips displayed on the time line window 56, and controls the image processor 21 to produce display video data based on the video data and write the display video data into the third VRAM 24 so that the material preview window 40 in which the image for the top one screen of the corresponding video browser image is displayed in the material display window 41 is displayed on the editing screen 30 and a time cursor 67 is displayed on the time line window 56.

Then, the host computer 15 advances the control to step SP52, in which, when it confirms that the mouse 12 is clicked with the cursor placed on the normal reproduction button 42E or the video browser reproduction button 42F, then it controls the external storage apparatus 22 to successively read out corresponding compression coded video data D1 or video data of the video browser and supply the video data D1 to the image processor 21 to produce the predetermined display video data based on the video data. The host computer 15 causes the display video data to be written into the third VRAM 24 so that a motion picture or a video browser image corresponding to the video clip displayed on the time line window 56 to be successively displayed in the material display window 41, and causes the time cursor 67 to be moved in accordance with reproduction of the video clip.

Then, the host computer 15 advances the control to step SP53, in which it determines whether or not the mouse 12 is clicked with the cursor placed on the stop button 42D of the material preview window 40. When an affirmative result is obtained, then the host computer 15 advances the control to step SP54, in which it controls the external storage apparatus 22 to stop the reproduction of the video clip. Consequently, the display of the motion picture or the video browser image displayed in the material display window 41 is stopped, and also the movement of the time cursor 67 of the time line window 56 is stopped.

Thereafter, the host computer 15 advances the control to step SP54, in which, when it confirms that the mouse 12 is clicked with the cursor placed on the close button 44 of the material preview window 40, it controls the external storage apparatus 22 to read out corresponding video data and controls the image processor 21 to produce predetermined display video data based on the video data and write the display video data into the third VRAM 24 so that the monitor 26 closes the material preview window 40 and displays the editing screen 30 (FIG. 7) in which the time cursor 67 on the time line window 56 is deleted. Thereafter, the host computer 15 advances the control to step SP56, in which it ends the clip reproduction processing procedure RT5.

While a negative result is obtained in step SP53 described above, the host computer 15 controls the external storage apparatus 22 to successively reproduce the video clips. Then, when the reproduction of all video clips displayed on the time line window 56 comes to an end before the mouse 12 is clicked with the cursor placed on the stop button 42D of the material preview window 40, the host computer 15 advances the control to step SP57, in which it automatically ends the reproduction of the video clips. Thereafter, the host computer 15 advances the control to step SP55.

3-6. Editing List Storage Processing Procedure

Figure 14:
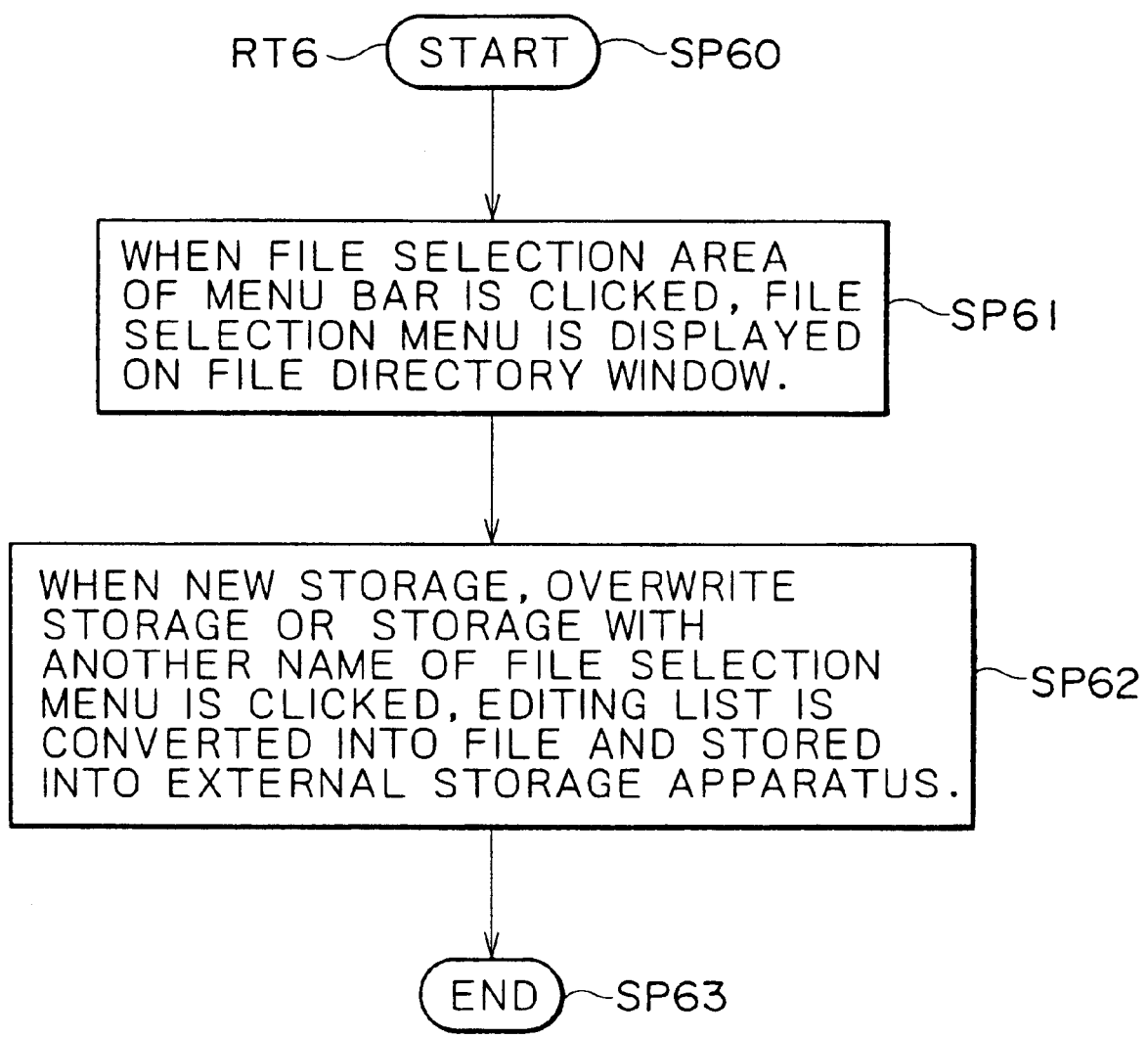
FIG. 14 is a flow chart illustrating an editing list storage processing procedure of the video editing apparatus of FIG. 2.

Further, in step SP12 of the editing processing procedure RT1 described hereinabove, the host computer 15 executes an editing list storage processing procedure RT6 illustrated in FIG. 14. Referring to FIG. 14, the host computer 15 starts the editing list storage processing procedure RT6 first in step SP60. Then, when the host computer 15 confirms in next step SP61 that the mouse 12 is clicked with the cursor placed on the file selection area 31A of the menu bar 31, it controls the external storage apparatus 22 to read out corresponding video data and controls the image processor 21 to produce display video data based on the video data and write the display video data into the third VRAM 24 so that the file selection menu 33 is displayed in the file directory window 32.

Then, the host computer 15 advances the control to step SP62, in which, when it confirms that the mouse 12 is clicked with the cursor placed on anywhere in the new storage designation area 33B, overwrite storage designation area 33C or new name storage designation area 33D in the file selection menu 33, then it converts an editing list composed of various information of all of the video clips and the corresponding audio clips displayed in the time line window 56 into a file and supplies the file to the external storage apparatus 22 so that it is stored into the external storage apparatus 22 in accordance with a corresponding storage method (to store newly, to store so as to overwrite the editing list stored already or to store with a changed file name). Thereafter, the host computer 15 advances the control to step SP63, in which it ends the editing list storage processing procedure RT6.

4. Operation and Effects of the Embodiment

In the video editing apparatus 10 having the construction described above, when it is in the material fetching mode, it fetches one of video signals S1A to S1N and S2A to S2N and a corresponding one of audio signals S3A to S3N and S4A to S4N supplied thereto from a designated video signal supply source, successively converts the fetched signals into digital video data D1 and audio data D2, compression codes the video data D1 and the audio data D2 by a means of the image processor 21, converts the compression coded data into a file, and stores the file into the external storage apparatus 22.

In this instance, in the video editing apparatus 10, the image processor 21 successively extracts slit data from the video data D1 by successively shifting the sampling position, and stores video data of a video browser obtained based on the slit data as a database for managing the video data file into the external storage apparatus 22. Further, in the video editing apparatus 10, the image processor 21 performs weighted averaging processing on audio data D2 and stores resulting waveform data of an audio waveform into a database of a corresponding video data file.

Thereafter, in the video editing apparatus 10, when a display mode is selected, the external storage apparatus 22 reproduces video data of a video browser and waveform data of an audio waveform corresponding to a plurality of video data files selectively designated as an object of editing, and an editing screen 30 on which such a plurality of video browsers 36A to 36D and a plurality of audio waveforms 37A to 37D as shown in FIG. 5 are displayed is displayed on the monitor 26.

Thus, on the editing screen 30, when the editing mode is selected in this condition, the video clips and audio clips can be successively produced based on various information designated and inputted by the mouse 12 and the keyboard 11 to produce an editing list.

Accordingly, in the video editing apparatus 10, when it is in the display mode, a plurality of video browsers 36A to 36D which are still pictures each produced by joining one-dimensional videos corresponding to slit data obtained by one-dimensional sampling from a motion picture are displayed on one screen of the monitor 26. Therefore, a general flow and contents of source video sequences of an object of editing can be readily grasped from the video browsers 36A to 36D. In addition, contents of a plurality of source video sequences can be readily compared with each other, and thus the working time for specifying a video clip from the source video sequences can be reduced significantly.

Further, in the video editing apparatus 10, since the corresponding audio waveforms 37A to 37D are displayed simultaneously together with the plurality of video browsers 36A to 36D, a flow and contents of the corresponding video browsers 36A to 36D can be grasped further readily based on the audio waveforms 37A to 37D.

Furthermore, in the video editing apparatus 10, when it is in the editing mode, since a series of specifying operations for successively designating mark-in points and mark-out points on the plurality of video browsers 36A to 36D displayed on the monitor can be successively performed, the number of times in which the external storage apparatus 22 is accessed can be reduced, and the time required for an editing operation executed upon transition from the displaying mode to the editing mode can be reduced significantly.

Further, in the video editing apparatus 10, when it is in the display mode or the editing mode, since a video browser image is displayed when necessary in order to confirm a source video sequence and a video clip, the time required for confirmation of contents can be reduced by fast reproduction of the source video sequence and the video clip.

With the video editing apparatus 10 having the construction described above, when it is in the material fetching mode, video data of video browsers based on video signals S1A to S1N and S2A to S2N are produced, and when the video editing apparatus 10 is in the displaying mode, a plurality of video browsers 36A to 36D are displayed at a time on the monitor 26, and then when the video editing apparatus 10 is in the editing mode, mark-in points and mark-out points are successively designated on the video browsers 36A to 36D. Consequently, the working time for grasping contents of a plurality of source video sequences to produce video clips can be reduced significantly. Consequently, the video editing apparatus 10 can significantly augment the efficiency in editing operation.

5. Other Embodiments

It is to be noted that, while, in the embodiment described above, when the video editing apparatus 10 is in the editing mode, it displays the top frame image of a video clip in the clip window 62 of the clip display window 61 as shown in FIG. 8, the present invention is not limited to this, and various information regarding a video clip may be displayed such that the top and last frame images of a video clip are displayed on the clip display window or only the last frame image is displayed.

Figure 15:
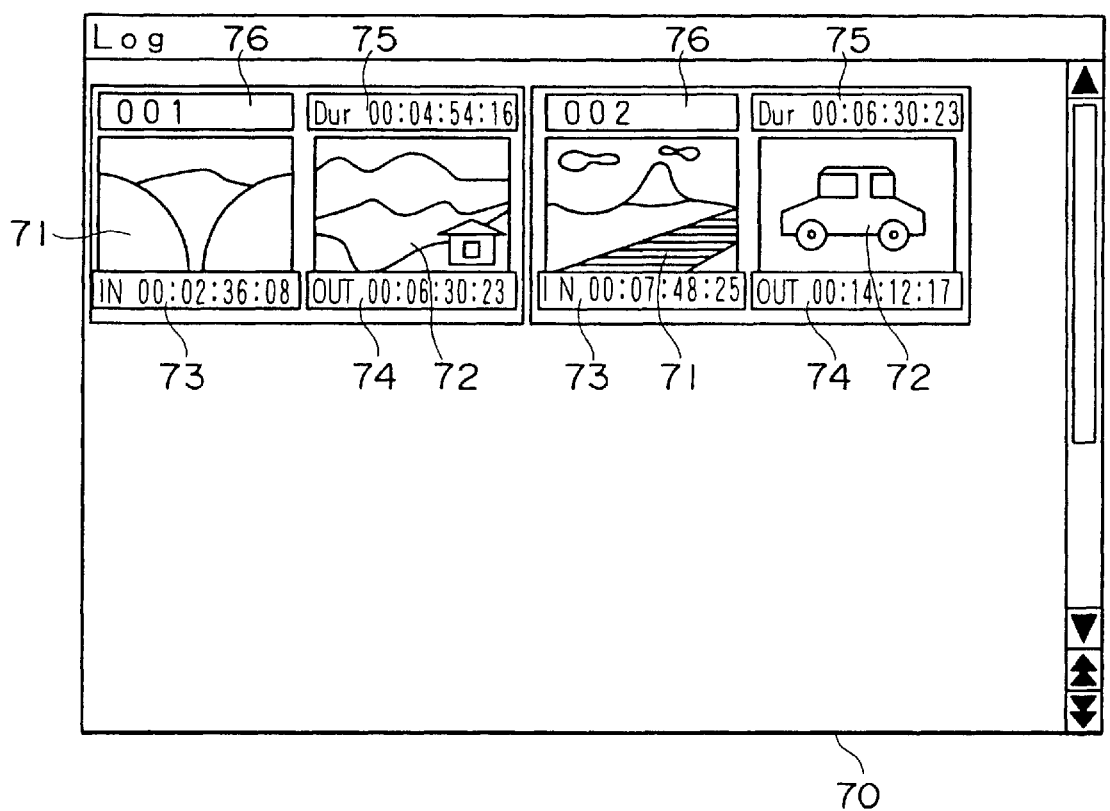
FIG. 15 is a schematic view showing a modified clip display window.

Incidentally, where the top and last frame images of a video clip are displayed on the clip display window, they may be displayed in such a manner as shown in FIG. 15. In particular, referring to FIG. 15, the top frame image of the video clip is displayed in a first clip window 71 of a clip display window 70 while the last frame image of the video clip is displayed in a second clip window 72 of the clip display window 70. Further, a time code of a mark-in point is displayed in a mark-in point display section 73 while a time code of a mark-out point is displayed in a mark-out point display section 74. Furthermore, the length of the video clip may be displayed in the form of a time code on a duration display section 75, and a clip name may be displayed on a clip name display section 76.

Further, while, in the embodiment described above, when the video editing apparatus 10 is in the material fetching mode, it converts one of audio signals S3A to S3N and S4A to S4N supplied thereto into digital data, converts the resulting audio data D2 into compression codes, converts the compression codes into a file and stores the file into the external storage apparatus 22, the present invention is not limited to this, and when the video editing apparatus 10 is in the material fetching mode, it may alternatively convert one of audio signals S3A to S3N and S4A to S4N supplied thereto into a digital signal and the resulting audio data D2 may be converted into a file as they are and stored the file into the external storage apparatus 22.

Furthermore, while, in the embodiment described above, when the video editing apparatus 10 is in the displaying mode, a plurality of video browsers 36A to 36D are displayed in the video browser window 35 of the editing screen 30, the present invention is not limited to this, and it is otherwise possible to expand the capabilities of the image processor 21 and the external storage apparatus 22 such that, when the video editing apparatus 10 is in the displaying mode, a plurality of display sections such as, for example, material preview windows, on each of which a motion picture or a video browser can be displayed are displayed in an editing screen and motion pictures or video browser images corresponding to source video sequences selectively designated as an object of editing are displayed in the display sections simultaneously, so that contents of the plurality of source video sequence can be grasped.

Furthermore, while, in the embodiment described above, when slit data are to be sampled out from a series of video data D1 to be displayed two-dimensionally, the sampling position is successively shifted from the right end to the left end of the screen, the present invention is not limited to this, and the sampling position may be successively shifted from the left end toward the right end of the screen, or may be successively shifted from one corner of a screen toward another corner of the screen on the diagonal line from the one corner. Thus, various directions can be applied as the shifting direction of the sampling position.

Further, while, in the embodiment described above, the displaying means for displaying a plurality of videos of an object of editing on one screen is formed from the host computer 15, reduced screen data formation section 21H of the image processor 21, third VRAM 24, digital to analog conversion circuit 25 and monitor 26, the present invention is not limited to this and various other constructions can be applied.

Furthermore, while, in the embodiment described above, the editing point designation means for successively designating an editing start point and an editing end point on each video displayed by the display means is formed from the keyboard 11, mouse 12, host computer 15, reduced screen data formation section 21H of the image processor 21, third VRAM 24, digital to analog conversion circuit 25 and monitor 26, the present invention is not limited to this and various other constructions can be applied.

Further, while, in the embodiment described above, the image processor 21 is applied as a data production means for producing video data of a still picture based on data obtained by one-dimensionally sampling video data in one direction in accordance with a series of videos to be displayed two-dimensionally while the sampling position is successively shifted in the other direction, the present invention is not limited to this, and various other data production means may be applied if video data of a still picture can be produced based on data obtained by one-dimensionally sampling video data in one direction in accordance with a series of video sequences to be displayed two-dimensionally while successively shifting the sampling position in the other direction.

While a preferred embodiment of the present invention has been described using specific terms, such description is for illustrative purposes only, and it is to be understood that changes and variations may be made without departing from the spirit or scope of the following claims.

What is claimed is:

1. Video editing apparatus for setting an editing point for a video sequence, comprising:

means for successively extracting from each of a plurality of video frames of the video sequence data representative of vertical slits and successively arranging the vertical slits as a number of video images representing individual video frames in a horizontal direction to produce a video browser for browsing the video sequence, in which the vertical slit data of each video frame of the video sequence is extracted from a position within the respective video frame which is different for each video frame in the video sequence such that each vertical slit of each video frame of the video sequence is located at a different position from each other, wherein each of the different positions of the individual video frames is successively shifted in a horizontal direction;

a display means for displaying the video browser on a display; and an editing means for setting an editing point for the video sequence in a coordinated relationship to a time base of the video browser.

2. A video editing apparatus for setting an editing point for a video sequence, comprising:

a video browser production means for producing a video browser for browsing the video sequence by successively extracting from each of a plurality of video frames of the video sequence data representative of vertical slits and successively arranging the vertical slits as a number of video images, in which the vertical slit data of each video frame of the video sequence is extracted from a position within the respective video frame which is different for each video frame in the video sequence such that each vertical slit of each video frame of the video sequence is located at a different position from each other, wherein each of the different positions of the individual video frames is successively shifted in a horizontal direction;

a display means for displaying the video browser on a display; and an editing point setting means for setting an editing start point and an editing end point in a coordinated relationship to the video browser displayed by said display means.

3. A video editing apparatus according to claim 2, wherein said video browser production means further produces an audio waveform representative of a level of an audio signal corresponding to the video sequence, and said display means displays the audio waveform in a coordinated relationship to the video browser in the time base direction together with the video browser.

4. A video editing apparatus according to claim 2, wherein said display means displays video browsers produced from a plurality of video sequences having the same time base in a coordinated relationship to each other.

5. A video editing method for setting an editing point for a video sequence, comprising the steps of:

producing a video browser for browsing the video sequence by successively extracting from each of a plurality of video frames of the video sequence data representative of vertical slits and successively arranging the vertical slits as a number of video images, in which the vertical slit data of each video frame of the video sequence is extracted from a position within the respective video frame which is different for each video frame in the video sequence such that each vertical slit of each video frame of the video sequence is located at a different position from each other, wherein each of the different positions of the individual video frames is successively shifted in a horizontal direction;

displaying the video browser on a display; and setting an editing start point and an editing end point in a coordinated relationship to the video browser displayed on said display.

6. A video editing method according to claim 5, wherein, when the video browser is produced, an audio waveform representative of a level of an audio signal corresponding to the video sequence is also produced, and the produced audio waveform is displayed together with the video browser in a coordinated relationship to the video browser in the time base direction.

7. A video editing method according to claim 5, wherein a plurality of video browsers produced from a plurality of video sequences having the same time base are displayed in a coordinated relationship to each other.

* * * * *